(12) United States Patent
Shibazaki

(10) Patent No.: US 9,165,377 B2
(45) Date of Patent: Oct. 20, 2015

(54) IMAGING APPARATUS WITH SCENE ANALYSIS

(75) Inventor: Kiyoshige Shibazaki, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 13/137,652

(22) Filed: Aug. 31, 2011

(65) Prior Publication Data

US 2011/0317026 A1 Dec. 29, 2011

Related U.S. Application Data

(62) Division of application No. 11/730,491, filed on Apr. 2, 2007, now Pat. No. 8,035,707.

(30) Foreign Application Priority Data

Apr. 6, 2006 (JP) .................................. 2006-105364

(51) Int. Cl.
*H04N 5/225* (2006.01)
*G06T 7/40* (2006.01)

(52) U.S. Cl.
CPC ....... *G06T 7/408* (2013.01); *G06T 2207/10024* (2013.01); *G06T 2207/20021* (2013.01)

(58) Field of Classification Search
CPC ........................... H04N 5/2258; H04N 1/6052
USPC ................................................. 348/262–265
See application file for complete search history.

(56) References Cited

U.S. PATENT DOCUMENTS

| | | | |
|---|---|---|---|
| 6,639,626 B1 * | 10/2003 | Kubo et al. ................ | 348/218.1 |
| 6,906,744 B1 | 6/2005 | Hoshuyama et al. | |
| 2001/0016117 A1 * | 8/2001 | Hirai et al. .................... | 396/225 |
| 2001/0030694 A1 | 10/2001 | Abe | |
| 2001/0055064 A1 * | 12/2001 | Minakami .................... | 348/222 |
| 2002/0085100 A1 * | 7/2002 | Takahashi .................... | 348/223 |
| 2003/0052978 A1 | 3/2003 | Kehtarnavaz et al. | |
| 2003/0095192 A1 | 5/2003 | Horiuchi | |
| 2003/0184660 A1 | 10/2003 | Skow | |
| 2003/0222991 A1 | 12/2003 | Muammar et al. | |
| 2004/0012700 A1 | 1/2004 | Okisu et al. | |
| 2004/0095478 A1 | 5/2004 | Takano et al. | |
| 2004/0233295 A1 | 11/2004 | Hoshuyama | |
| 2004/0246348 A1 | 12/2004 | Takeshita | |
| 2005/0007610 A1 | 1/2005 | Kawase et al. | |
| 2005/0179807 A1 * | 8/2005 | Lin ............................... | 348/344 |

(Continued)

FOREIGN PATENT DOCUMENTS

| | | |
|---|---|---|
| EP | 0 585 935 A1 | 3/1994 |
| JP | A-2001-103508 | 4/2001 |

(Continued)

OTHER PUBLICATIONS

Dec. 21, 2010 Office Action issued in JP Application No. 2006-105364.

(Continued)

*Primary Examiner* — Twyler Haskins
*Assistant Examiner* — Dwight C Tejano
(74) *Attorney, Agent, or Firm* — Oliff PLC

(57) ABSTRACT

An imaging apparatus comprises an image-capturing element that outputs image signals representing a plurality of color components and an analyzing device that analyzes a captured photographic image based upon image signals with linearity, which are output from the image-capturing element.

13 Claims, 24 Drawing Sheets

(56) References Cited

U.S. PATENT DOCUMENTS

2005/0231740 A1    10/2005    Uchino
2006/0023093 A1*    2/2006    Tan et al. ............... 348/263

FOREIGN PATENT DOCUMENTS

| | | |
|---|---|---|
| JP | A-2002-354338 | 12/2002 |
| JP | A-2004-040417 | 2/2004 |
| JP | A-2004-215236 | 7/2004 |
| JP | A-2005-033255 | 2/2005 |
| JP | A-2005-260465 | 9/2005 |
| JP | A-2005-311581 | 11/2005 |

OTHER PUBLICATIONS

Finlayson, G. et al. "Color by Correlation: A Simple, Unifying Framework for Color Constancy." IEEE Transactions on Pattern Analysis and Machine Intelligence, vol. 23, No. 11, Nov. 2001.

Sharma, G. et al. "Color Imaging for Multimedia." Proceedings of the IEEE, vol. 86, No. 6, Jun. 1998.

Apr. 5, 2011 Extended European Search Report issued in EP Application No. 07105683.2.

Dec. 23, 2011 Office Action issued in Chinese Application No. 200710096712.8 (with English translation).

* cited by examiner

SPECTRAL DISTRIBUTION

WAVELENGTH

SPECTRAL DISTRIBUTION

WAVELENGTH

RELATIVE SPECTRAL EMITTING STRENGTH

WAVELENGTH [nm]

FIG. 5A

TABLE 1

| R:G:B | COLOR TEMPERATURE [k] | COEFFICIENT |
|---|---|---|
| 2:5:10 | 6000K | A1 |
| ⋮ | ⋮ | ⋮ |
| 1:1:10 | 3500K | An |

FIG. 5B

TABLE 2

| R:G:B | COLOR |
|---|---|
| 1:5:10 | BLUE |
| ⋮ | ⋮ |
| 5:5:5 | WHITE |
| ⋮ | ⋮ |
| 10:5:1 | RED |

FIG. 24

|  |  | PHOTOGRAPHIC IMAGE-CAPTURING ELEMENT | | AUXILIARY IMAGE-CAPTURING ELEMENT | |
|---|---|---|---|---|---|
|  |  | PHOTOGRAPHING CONDITION SETTINGS | IMAGE PROCESSING | PHOTOGRAPHING CONDITION SETTINGS | IMAGE PROCESSING |
| FIRST EMBODIMENT 151 | SINGLE SHOT PHOTOGRAPHING | × | ○ | — | — |
| | CONTINUOUS SHOOTING | SELECTED FOR SECOND AND SUBSEQUENT IMAGES WITH MIRROR HELD UP ○ | ○ | — | — |
| | DYNAMIC IMAGE PHOTOGRAPHING | SELECTED FOR SECOND AND SUBSEQUENT IMAGES ○ | ○ | — | — |
| | THROUGH IMAGE DISPLAY | SELECTED FOR SECOND AND SUBSEQUENT IMAGES WITH MIRROR HELD UP ○ | ○ | — | — |
| SECOND EMBODIMENT 152 | SINGLE SHOT PHOTOGRAPHING | — | — | ○ | Δ1 |
| | CONTINUOUS SHOOTING | — | — | ○ | ○ |
| | DYNAMIC IMAGE PHOTOGRAPHING | — | — | ○ (FIRST IMAGE) | ○ (FIRST IMAGE) |
| | THROUGH IMAGE DISPLAY | — | — | ○ | ○ |
| THIRD EMBODIMENT 153 | SINGLE SHOT PHOTOGRAPHING | × | ○ | ○ | × |
| | CONTINUOUS SHOOTING | SELECTED FOR SECOND AND SUBSEQUENT IMAGES WITH MIRROR HELD UP ○ | ○ | ○ | × |
| | DYNAMIC IMAGE PHOTOGRAPHING | SELECTED FOR SECOND AND SUBSEQUENT IMAGES ○ | ○ | ○ (FIRST IMAGE) | × |
| | THROUGH IMAGE DISPLAY | SELECTED FOR SECOND AND SUBSEQUENT IMAGES WITH MIRROR HELD UP ○ | ○ | ○ | ○ |

Δ1: IMAGE PROCESSING EXECUTED BY USING IMAGE DATA OBTAINED PRIOR TO RAISING THE MIRROR

IMAGING APPARATUS WITH SCENE ANALYSIS

This is a Division of application Ser. No. 11/730,491 filed Apr. 2, 2007, which claims the benefit of Japanese Application No. 2006-105364 filed Apr. 6, 2006. The disclosure of the prior applications is hereby incorporated by reference herein in their entirety.

INCORPORATION BY REFERENCE

The disclosure of the following priority application is herein incorporated by reference: Japanese Patent Application No. 2006-105364 filed Apr. 6, 2006

BACKGROUND OF THE INVENTION

1. Field of the Invention

The present invention relates to an imaging apparatus that executes scene analysis by using image data output from an image-capturing element.

2. Description of Related Art

Japanese Laid Open Patent Publication No. 2001-103508 discloses a camera that executes image processing on raw data provided by an image-capturing element and then executes scene analysis based upon a photographic image generated through image processing.

SUMMARY OF THE INVENTION

However, there is a problem in that a significant length of time is required to execute analysis processing for purposes of scene analysis by generating an image from raw data, an optimal solution to which is yet to be proposed.

An imaging apparatus according to the present invention comprises an image-capturing element that outputs image signals representing a plurality of color components and an analyzing device that analyzes a captured photographic image based upon image signals with linearity, which are output from the image-capturing element. It is preferred that the image signal with linearity is RAW data.

The analyzing device of the imaging apparatus may analyze the photographic image based upon a discrete spectral distribution of the plurality of color components represented in the image signals. The analyzing device of this imaging apparatus may analyze the photographic image based upon spectral characteristics manifesting in small areas defined by dividing an entire area of the photographic image and an absolute brightness value calculated in correspondence to each of the small areas as well as spectral characteristics manifesting over the entire area.

The analyzing device of the imaging apparatus may analyze a light source by calculating color continuity manifesting over an entire area of the photographic image based upon discrete spectral characteristics of the plurality of color components represented in the image signals.

It is preferable that the analyzing device of the imaging apparatus extracts an achromatic area within the photographic image based upon continuity of spectral characteristics manifesting over an entire area of the photographic image and continuity of the spectral characteristics manifesting in small areas defined by dividing the entire area. The analyzing device of the imaging apparatus may extract a small area as an achromatic area if the shape of a curve representing the spectral characteristics manifesting over the entire area substantially matches the shape of a curve representing the spectral characteristics manifesting in the small area.

The analyzing device of the imaging apparatus may extract a feature of the photographic image based upon discrete spectral characteristics of the individual color components manifesting over an entire area of the photographic image and discrete spectral characteristics of the individual color components manifesting in small areas defined by dividing the entire area. In this case, the imaging apparatus extracts the feature by identifying a color inherent to a subject.

The analyzing device of the imaging apparatus can calculate an absolute brightness value for an entire area of the photographic image based upon brightness values corresponding to the individual color components detected over the entire area and estimate a photographing location based upon the absolute brightness value. The analyzing device of the imaging apparatus may calculate a color temperature for the entire area of the photographic image and estimates a photographing condition based upon the color temperature and the absolute brightness value.

It is preferable that the imaging apparatus further comprises an arithmetic operation circuit that determines through arithmetic operation photographing condition settings, at which a photographing operation is to be executed by the image-capturing element, based upon analysis results provided by the analyzing device. In this case, the imaging apparatus may further comprise a selection unit that selects a specific photographing mode among a single shot mode, a continuous shooting mode, a dynamic image mode and a through image mode and the like. The arithmetic operation circuit of this imaging apparatus determines through arithmetic operation the photographing condition settings based upon the analysis results and results of the selection made by the selection unit.

It is preferable that the imaging apparatus further comprises an image processing circuit that executes image processing on the image signals based upon analysis results provided by the analyzing device. In this case, the imaging apparatus may further comprise a selection unit that selects a specific photographing mode among a single shot mode, a continuous shooting mode, a dynamic image mode, a through image mode and the like. The image processing circuit of this imaging apparatus executes the image processing based upon the analysis results and the results of the selection made by the selection unit.

The image-capturing element of the imaging apparatus may be a photographic image-capturing element that outputs photographic image signals representing a plurality of color components by capturing a subject image passing through a photographic lens.

The imaging apparatus may further include, in addition to the image-capturing element, a photographic image-capturing element that outputs photographic image signals representing a plurality of color components by capturing a subject image passing through a photographic lens. The image-capturing element and the photographic image-capturing element of the imaging apparatus may be respectively a first image-capturing element that has first spectral characteristics with regard to the plurality of color components and a second image-capturing element that has second spectral characteristics different from the first spectral characteristics with regard to the plurality of color components. The analyzing device of the imaging apparatus analyzes a photographed image based upon image signals with linearity, which are output from the first and second image-capturing elements. The first image-capturing element of the imaging apparatus may be an auxiliary image-capturing element that is disposed at a position equivalent to the position of the photographic image-capturing element relative to the photographic lens and outputs auxiliary image signals. In this case, the number of pixels at the auxiliary image-capturing element of the imaging apparatus is smaller than the number of pixels at the photographic image-capturing element.

BRIEF DESCRIPTION OF THE DRAWINGS

FIG. 5 presents examples of tables that may be used when extracting the feature of the subject, with FIG. 5A showing Table 1, which indicates the correspondence among the R, G and B value ratios over the entire image plane, the color temperature and the coefficient and FIG. 5B showing Table 2, which indicates the correspondence between the R, G and B value ratios and the color temperature in the block areas;

FIG. 24 presents a diagram summarizing the correspondence between the image-capturing element used for the scene analysis and the processing executed in each of the embodiments.

DESCRIPTION OF PREFERRED EMBODIMENT

First Embodiment

Figure 1:
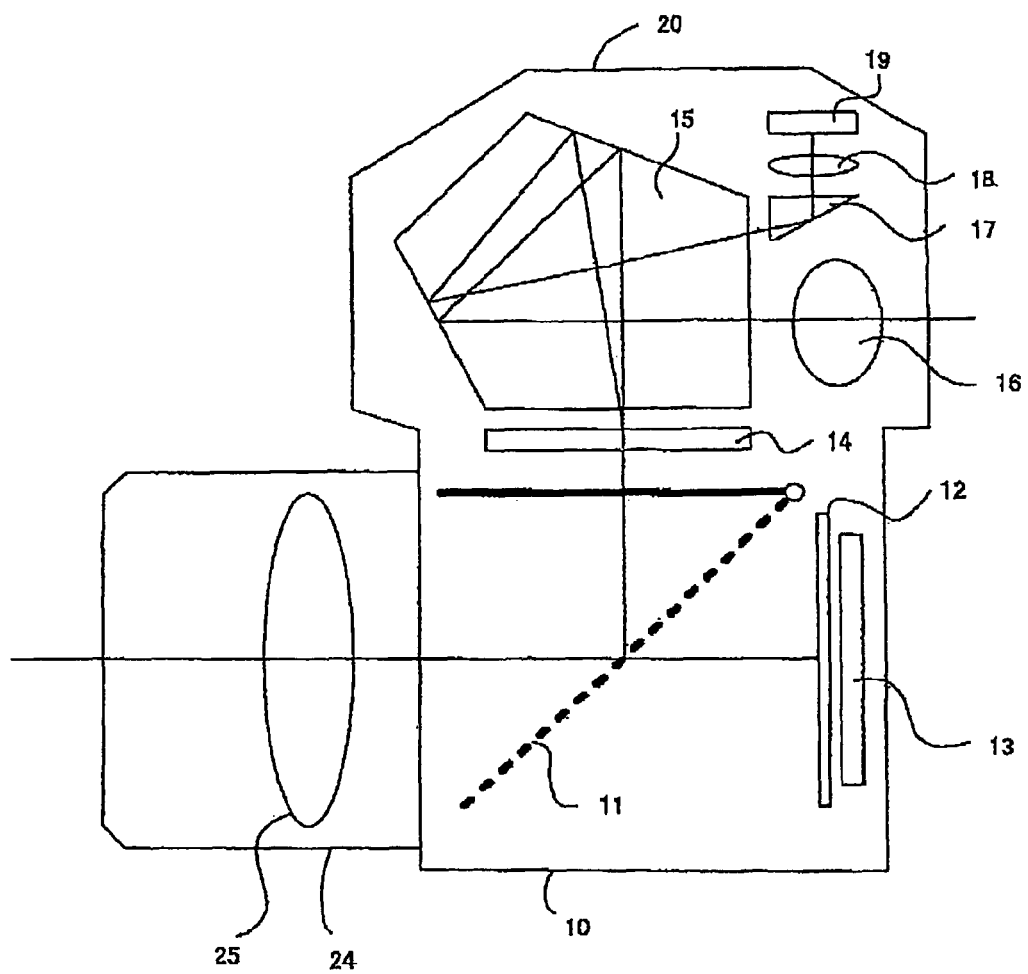
FIG. 1 shows the essential structure adopted in the single lens reflex electronic camera achieved in an embodiment of the present invention.

The following is an explanation of an embodiment of the present invention, given in reference to the drawings. FIG. 1 shows the essential structure adopted in the single lens reflex electronic camera achieved in the first embodiment of the present invention. A detachable viewfinder device 20 and an exchangeable lens 24 are both mounted at a camera body 10 in FIG. 1.

Subject light having passed through the exchangeable lens 24 and entered the camera body 10 is guided upward via a quick-return mirror 11, which is positioned as indicated by the dotted line prior to a shutter release, to form an image at a viewfinder mat 14. The subject light then enters a pentaprism 15. The pentaprism 15 guides the subject light having entered therein toward an eyepiece lens 16 and also guides part of the subject light to a prism 17. The light having entered the prism 17 then enters an auxiliary image-capturing element 19 via a lens 18 and forms a subject image on the imaging surface of the auxiliary image-capturing element. The auxiliary image-capturing element 19 is disposed at a position that is optically equivalent to the position of a photographic image-capturing element 13 relative to the exchangeable lens 24. The auxiliary image-capturing element 19, which may be constituted with a CCD image sensor equipped with a plurality of photoelectric conversion elements each corresponding to a pixel, captures the subject image formed on its imaging surface and outputs photoelectric conversion signals corresponding to the brightness of the subject image. In the first embodiment, a brightness value of the subject is calculated based upon the output signals provided from the auxiliary image-capturing element 19. In other words, the auxiliary image-capturing element 19 is utilized for exposure calculation.

Following a shutter release, the quick-return mirror 11 rotates to the position indicated by the solid line, the subject light is guided to the photographic image-capturing element 13 via a shutter 12 and a subject image is formed on the imaging surface of the photographic image-capturing element. The photographic image-capturing element 13, which may be constituted with a CCD image sensor equipped with a plurality of photoelectric conversion elements each corresponding to a pixel, captures the subject image formed on the imaging surface and outputs a photoelectric conversion signals corresponding to the brightness of the subject image.

The number of pixels at the photographic image-capturing element 13 is greater than the number of pixels at the auxiliary image-capturing element 19. The photographic image-capturing element 13 may be equipped with, for instance, at least several million pixels, whereas the auxiliary image-capturing element 19 may be equipped with, for instance, several hundred thousand pixels. At the imaging surface of each of the photographic image-capturing element 13 and the auxiliary image-capturing element 19, R (red), G (green) and B (blue) color filters are disposed each in correspondence to the position of a specific pixel. Since each image-capturing element captures a subject image through the color filters, imaging signals output from the image-capturing element each contain color information expressed in an RGB colorimetric system.

Figure 2:
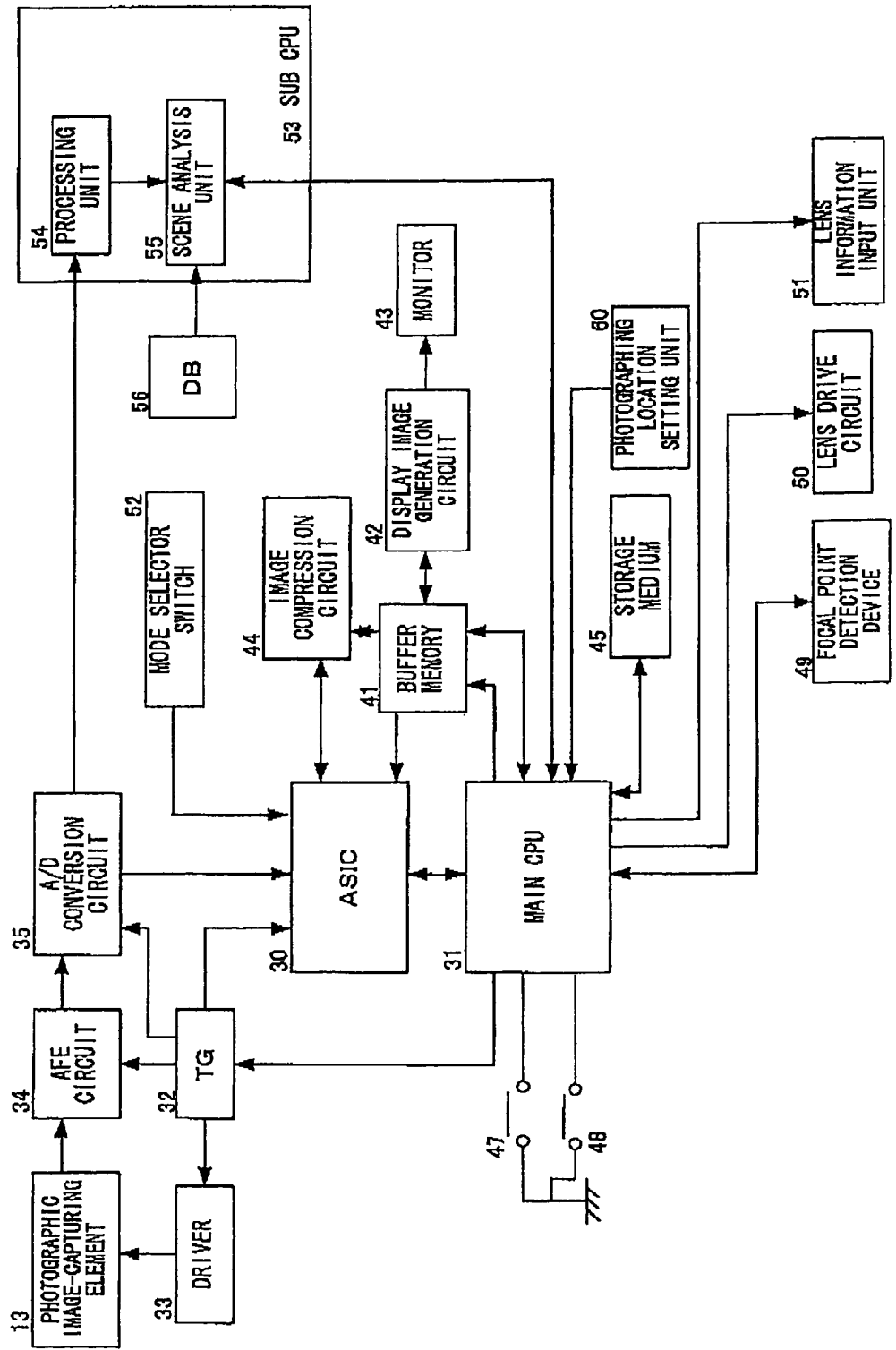
FIG. 2 is a block diagram showing the circuit structure adopted in the single lens reflex electronic camera achieved in the first embodiment of the present invention.

FIG. 2 is a block diagram showing the circuit structure adopted in the electronic camera achieved in the first embodiment. In the electronic camera in the first embodiment, scene analysis is executed by using image data (raw data) output from the photographic image-capturing element 13. It is to be noted that since the output signals from the auxiliary image-capturing element 19 are utilized for the exposure calculation but not for the scene analysis in the first embodiment, FIG. 2 does not show the auxiliary image-capturing element.

A timing generator (TG) 32 generates a timing signal in response to a command output from a main CPU 31 and provides the timing signal to a driver 33, an AFE (analog front end) circuit 34 and an A/D conversion circuit 35. The driver 33 generates a drive signal to be used to engage the photographic image-capturing element 13 in electrical charge storage and then in transfer of the stored electrical charges, by using the timing signal and provides the drive signal thus generated to the photographic image-capturing element 13. The AFE circuit 34 executes analog processing (such as gain control) on photoelectric conversion signals (stored electrical charges) output from the photographic image-capturing element 13. The A/D conversion circuit 35 converts the imaging signals having undergone the analog processing to digital signals. The raw data constituted with these digital signals are output to an image processing circuit 30 and a sub CPU 53. As detailed later, the sub CPU 53 executes scene analysis by using the raw data.

The image processing circuit 30 and the sub CPU 53 are connected to the main CPU 31. The main CPU 31 executes a specific arithmetic operation by using signals input thereto from various blocks including the image processing circuit 30 and the sub CPU 53 and outputs control signals generated based upon the arithmetic operation results to the individual blocks. The image processing circuit 30, which may be, for instance, an ASIC, executes image processing on the digital image signals input thereto from the A/D conversion circuit 35 based upon scene analysis results input thereto from the sub CPU 53 via the main CPU 31. The image processing executed by the image processing circuit 30 includes image preprocessing and image post processing.

In the image preprocessing, outline emphasis, color temperature adjustment (white balance adjustment) and the like are executed on the image (raw digital image signal) captured by the photographic image-capturing element 13. The image preprocessing is executed based upon the analysis results obtained through scene analysis processing to be detailed later. In the image postprocessing, format conversion is executed for the digital image signals having undergone the image preprocessing. Through the format conversion, the digital image signals are converted to a format optimal for image compression.

The sub CPU 53 executes the scene analysis to be detailed later by using the digital image signals (raw data) input thereto from the A/D conversion circuit 35. The sub CPU 53 outputs information indicating the light source (color temperature), the photographing location, the color of the primary photographic subject, the characteristics of the primary photographic subject and the like, which is obtained by executing the scene analysis, to the image processing circuit 30 via the main CPU 31. The scene analysis results are used in image processing executed in a single shot mode, a continuous shooting mode, a dynamic image mode and a through image display mode. In addition, in the continuous shooting mode, the dynamic image mode and the through image display mode, the scene analysis results are also used to determine photographing condition settings such as the exposure value for an image to be photographed subsequently.

An image compression circuit 44 executes image compression processing on the digital image signals having undergone the image postprocessing at the image processing circuit 30 by adopting a specific method such as the JPEG method. A display image generation circuit 42 generates display data to be used to display the captured image at an external monitor 43 by using the digital image signals having undergone the image preprocessing. At the external monitor 43, which may be constituted with an LCD, the image reproduced by using the display data is displayed.

A buffer memory 41 is used to temporarily store data currently undergoing the image preprocessing, the image postprocessing, the image compression processing and the display data generation processing and data having undergone such processing. It is also used to temporarily store image signals, corresponding to a plurality of frames of images captured in succession in the continuous shooting mode and the dynamic image mode. In a recording medium 45 constituted with a memory card or the like that can be detachably loaded into the electronic camera body 10, the image data resulting from the image compression processing are recorded.

A halfway press switch 47 and a full press switch 48, which are turned on/of f by interlocking with a depression of a shutter release button (not shown), each output an ON signal or an OFF signal to the main CPU 31.

Via a mode selector switch 52, the electronic camera operation can be switched to a photographing mode, the through image display mode, a reproduction or playback mode or the like. The continuous shooting mode, the single shot mode, the dynamic image mode or the like can be selected as the photographing mode. In the continuous shooting mode, images are photographed by driving the quick-return mirror 11 up/down for each photographic frame if the continuous shooting speed is set at a level lower than a predetermined continuous shooting speed, but images are photographed by holding the quick-return mirror 11 at the UP position indicated by the solid line in FIG. 1 if the continuous shooting speed setting is equal to or higher than the predetermined continuous shooting speed. In the through image display mode, images are displayed at the external monitor 43 as dynamic images without executing photographing processing or recording processing. By performing a specific operation, the photographer is able to choose to drive the quick-return mirror 11 up/down in correspondence to each frame or to hold the quick-return mirror at the UP position indicated by the solid line in FIG. 1 in the through image display mode. In the reproduction mode, image data recorded in the recording medium 45 are read out and an image reproduced by using the image data is displayed at the external monitor 43.

A focal point detection device 49 detects a focal point adjustment state achieved with the lens 25 in response to a command output from the main CPU 31 and outputs a detection signal to the main CPU 31. A lens drive device 50 drives the lens 25 forward/backward along the optical axis in response to a command issued by the main CPU 31. A lens information input unit 51 detects lens information indicating the aperture value and the like at the exchangeable lens 24 and outputs a detection signal to the main CPU 31.

As the photographer performs a photographing location time zone selection operation based upon a map displayed at the external monitor 43, an internal clock at a photographing location setting unit 60 is adjusted to the local time at the photographing location and the photographing location setting unit 60 then outputs a time point signal to the main CPU 31. Alternatively, the photographing location setting unit 60 may set the latitude, the longitude and the altitude of the photographing location, UTC (coordinated universal time) data or the like based upon information received from a GPS (global positioning system).

Scene Analysis Based Upon Raw Data

The following is a detailed explanation of the scene analysis executed by the sub CPU 53.

The sub CPU 53 includes as its functional blocks a processing unit 54 and a scene analysis unit 55. The processing unit 54 processes raw data input thereto from the A/D conversion circuit 35, which are constituted with image signals having linearity. Based upon the light intensity distribution of imaging signals output through the color filters each corresponding to the R color, the G color or the B color at the photographic image-capturing element 13, the processing unit 54 detects the spectral distribution manifesting over the entire area of the photographic image and outputs the detected spectral distribution to the scene analysis unit 55. In addition, the processing unit 54 divides the pixels at the photographic image-capturing element 13 into blocks each corresponding to a specific area, so as to allow the image signals to be handled in units of individual block areas. The processing unit 54 is thus able to detect the spectral distribution in each block area and an absolute brightness value corresponding to each block area and to output the detection results to the scene analysis unit 55.

The scene analysis unit 55 executes scene analysis based upon the spectral distribution and the absolute brightness value corresponding to each block area, as well as the spectral distribution manifesting over the entire area of the photographic image, which are all input from the processing unit 54, and photographing information indicating the photographing distance, the focal length, the photographing time, the photographing location and the like, which is input from the main CPU 31, by referencing various tables stored in a database 56. The scene analysis unit 55 executes scene analysis by detecting light source information (color temperature), identifying the photographing location, detecting color information pertaining to the primary photographic subject and extracting feature of the primary photographic subject. The results of the scene analysis are output to the main CPU 31.

Color Temperature

Figure 3A:
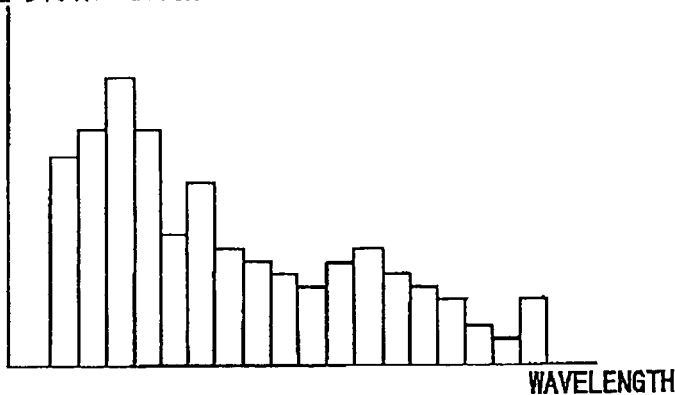
FIG. 3 presents an example of spectral distribution manifested by raw data over the photographic image, with FIG. 3A showing the spectrum of the raw data, FIG. 3B showing continuity in the spectral distribution estimated based upon the data in FIG. 3A and FIG. 3C showing an example of the correlation that may exist between a spectral distribution curve and the light source.
Figure 3B:
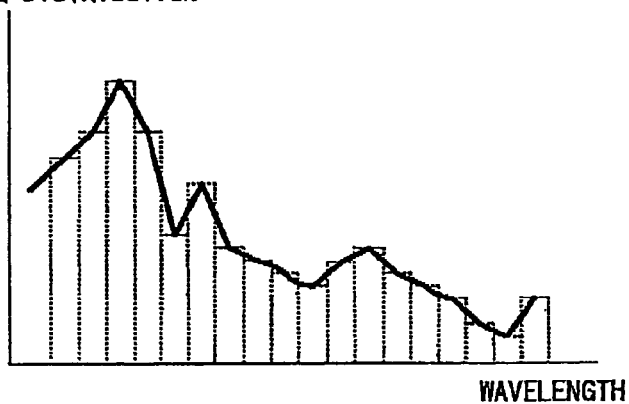
Figure 3C:
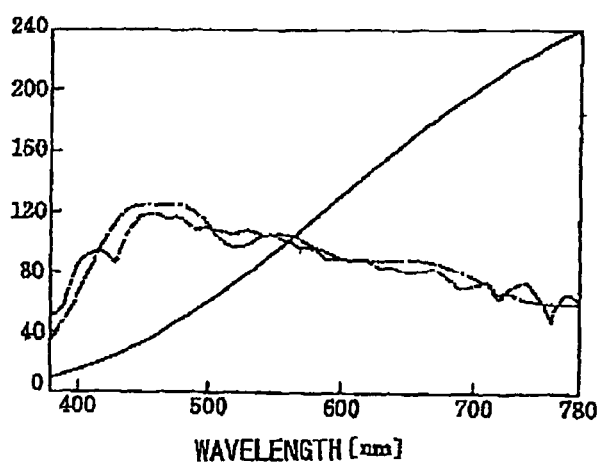

Based upon the spectral distribution over the entire area of the photographic image detected by the processing unit 54, the scene analysis unit 55 detects the light source information (color temperature). The R, G and B outputs obtained as the raw data indicate a discrete spectral distribution as in the spectrum presented in FIG. 3A. Based upon these discrete data, the scene analysis unit 55 estimates continuity of the spectral distribution as indicated by the bold line in FIG. 3B and detects the light source in correspondence to the shape of the continuous curve. FIG. 3C presents an example of the correspondence between the spectral distribution curve and a specific light source. The solid line indicates the spectral distribution curve achieved by using an incandescent lamp with a color temperature at approximately 2850° K, the spectral distribution curve achieved by using daylight with a color temperature of approximately 6500° K as the light source is indicated by the dotted line and the spectral distribution curve achieved by using a typical light mix as the light source is indicated by the one-point chain line. It is to be noted that information indicating such a correspondence is stored in advance at the database 56 in a table format or the like and is read out by the scene analysis unit 55 when it is engaged in light source information detection.

Identifying the Photographing Location

Based upon the absolute brightness values detected by the processing unit 54, the scene analysis unit 55 estimates the photographing location. The absolute brightness value corresponding to each block area is calculated by the processing unit 54 as expressed in (1) below by using the R, G and B outputs in the raw data.

$$Y=0.3R+0.59G+0.11B \quad (1)$$

Based upon the absolute brightness values calculated as expressed in (1) above, the scene analysis unit 55 makes a decision with regard to the photographing location, i.e., as to whether or not the image has been photographed indoors or outdoors. For instance, if the absolute brightness values are equal to or greater than a predetermined threshold value, the photographing location is judged to be an outdoors location. In addition, the scene analysis unit 55 further determines specific conditions at the photographing location by using the light source information explained earlier. Namely, based upon the absolute brightness values and the color temperature, the scene analysis unit 55 is able to determine that the photographing location was an indoors location illuminated by a fluorescent lamp, that the photographing location was an indoors location illuminated by an incandescent lamp or the like. For instance, the relationship among the absolute brightness value, the color temperature and the light source is stored in a table format or the like at the database 56 and the scene analysis unit 55 makes a decision with regard to the photographing location by referencing this table. Furthermore, the scene analysis unit 55 is able to identify a specific photographing locale, e.g., Hawaiian seaside or Hong Kong at night, based upon information indicating the photographing time and the photographing location, which is input thereto from the photographing location setting unit 60 via the main CPU 31.

Color Information on the Photographic Subject

Figure 4A:
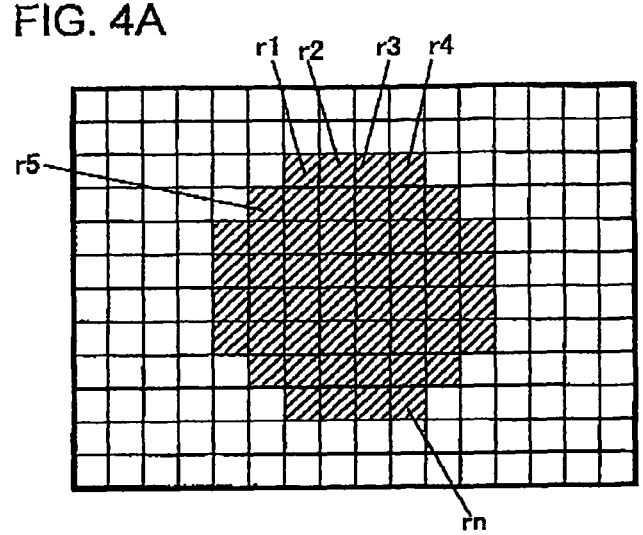
FIG. 4 illustrates an example of color information detection for detecting color information with regard to a primary subject based upon the spectral distributions manifesting in individual block areas, with FIG. 4A showing how the entire area of the photographic image may be divided into a predetermined number of block areas and FIG. 4B showing the spectral distribution that may manifest in block areas r1 through rn.
Figure 4B:
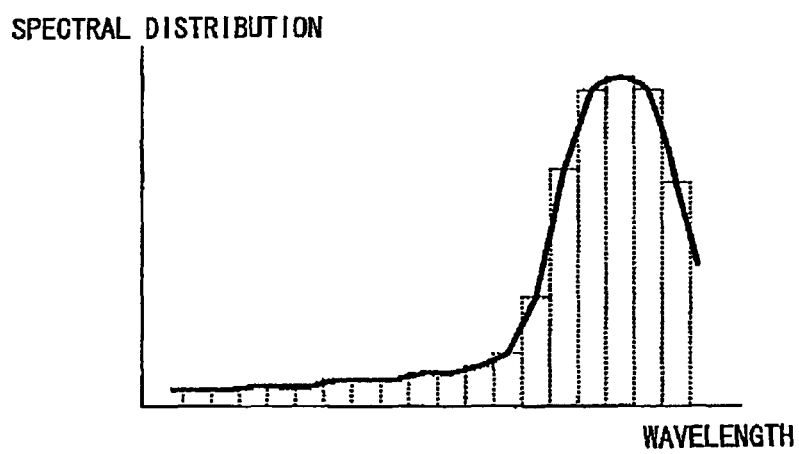

Based upon the spectral distribution detected in correspondence to the individual block areas, the scene analysis unit 35 detects color information indicating the color of the primary photographic subject. For instance, let us assume that the processing unit 54 detects the spectral distribution indicated in FIG. 4B over an area ranging from a block r1 to a block rn in the image plane divided into small blocks, as shown in FIG. 4A. Since this spectral distribution shows a great deal of the R component, the scene analysis unit 55 judges that the color of the subject present over this area is red. In addition, since the blocks from which the R component is output at a high ratio form a substantially circular shape, as indicated in FIG. 4A, the scene analysis unit 55 is able to estimate from the particulars of the subject present over this area that the subject is a round, red object such as a red ball or an apple. If, on the other hand, the color of the subject present over the blocks r1~rn is judged to be skin color based upon the spectral distribution manifesting over this area, the scene analysis unit 55 is able to estimate that a person's face occupies the area. Furthermore, by using the information indicating the photographing distance and the focal length, which is input from the main CPU 31, the scene analysis unit 55 is able to determine the size of the face and estimate the age of the photographic subject, e.g., whether the photographic subject is a baby or an adult. If the subject is judged to be a baby, the main CPU 31 may impose restrictions on light emission at an electronic flash unit (not shown).

Extracting Feature of the Photographic Subject

Figure 6:
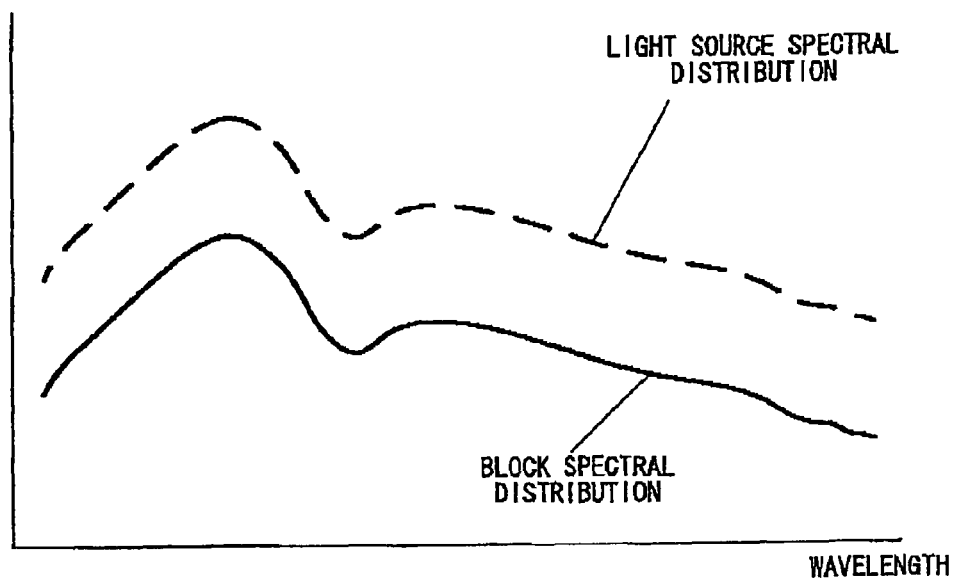
FIG. 6 presents examples of spectral distribution curves that may manifest in correspondence to the entire area of the photographic image and a block area when the block area is judged to be an achromatic area.

The scene analysis unit 55 extracts the feature of the subject by comparing the spectral distribution over the entire area of the photographic image, i.e., the light source information (color temperature) with the spectral distribution detected in each block area. Namely, by deducing the inherent spectral reflectance of the subject based upon the spectral distribution manifesting in each block area affected by the light source, the scene analysis unit 55 identifies a color inherent to the subject. The scene analysis unit 55 determines the color of each block area by referencing Table 1 indicating the correspondence among the R, G and B value ratios over the entire area of the photographic image, the color temperature and the coefficient, and Table 2 indicating the correspondence between R, G and B value ratios in each block area and the color temperature, both stored at the database 56. For instance, let us assume that the R, G and B value ratios over the entire area of the photographic image are 2:5:10 and that the color temperature has been judged to be 600° K. The scene analysis unit 55 references Table 1 shown in FIG. 5A and selects a coefficient A1 in correspondence to these values. Let us also assume that the ratios of the values obtained by multiplying the R, G and B values in a given block area by the coefficient A1 are 10:5:1. The scene analysis unit 55 references Table 2 shown in FIG. 5B and determines the color of the block area to be red in correspondence to these ratios. Moreover, if the shape of the spectral distribution curve over the entire area of the photographic image indicated by the dotted line and the shape of the spectral distribution curve manifesting in the block area, indicated by the solid line, substantially match (are similar to each other), as shown in FIG. 6, the scene analysis unit 55 judges the particular block area to be an achromatic area.

Figure 7:
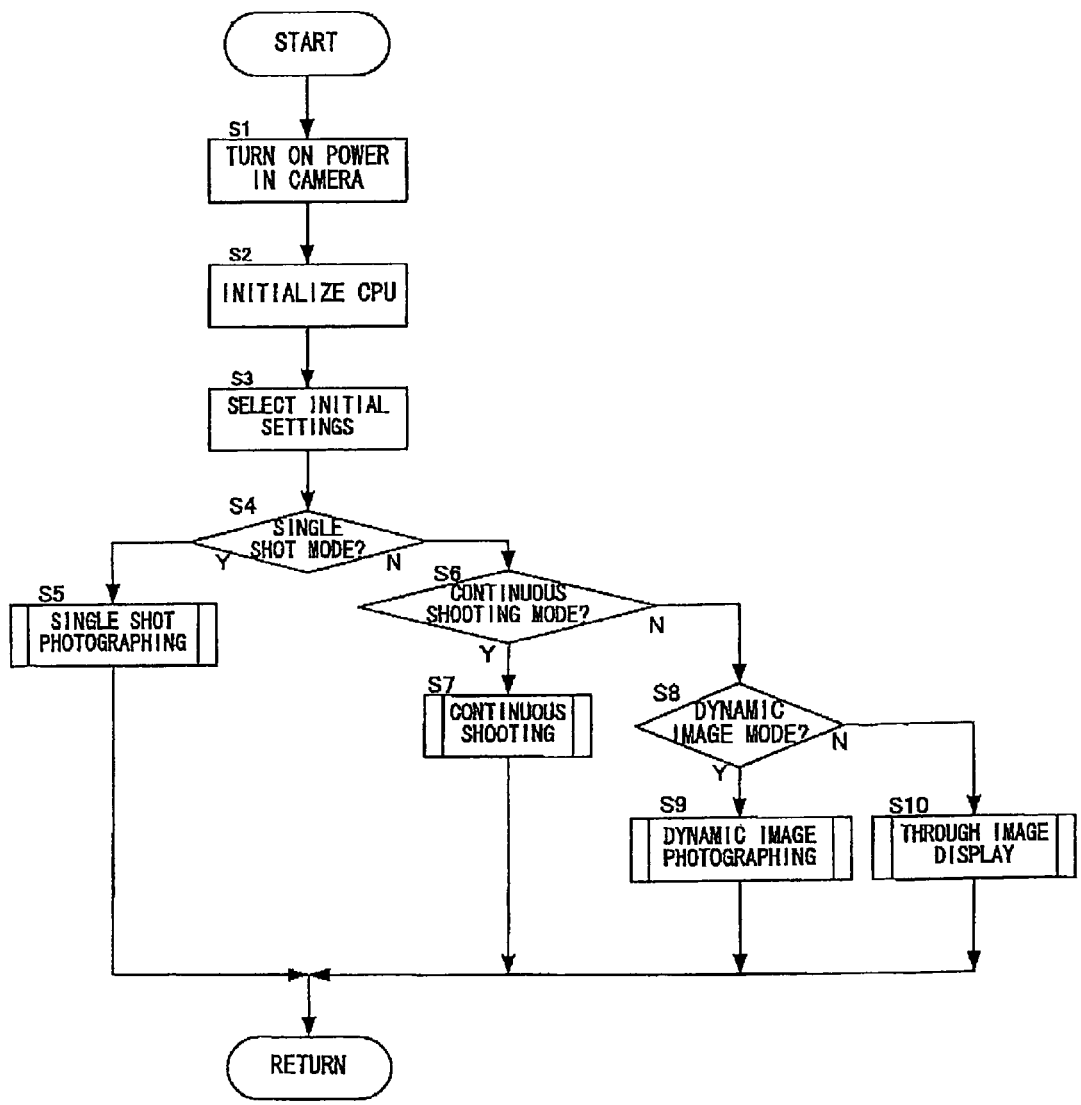
FIG. 7 presents a flowchart of the overall operation executed in the single lens reflex electronic camera achieved in the embodiment.

The photographing processing executed in the electronic camera described above is now explained in reference to the flowchart presented in FIG. 7. The program in conformance to which the processing in FIG. 7 is executed is stored in a ROM (not shown) in the main CPU 31 and is started up in response to an ON signal input to the main CPU 31 from a camera power source.

In step S1 in FIG. 7, camera POWER ON processing is executed before the operation proceeds to step S2. As a result, power is supplied to the individual blocks (excluding the image-capturing element and its peripheral circuits) from a power source circuit (not shown). In step S2, the camera initializes itself by, for instance, selecting specific port settings and then the operation proceeds to step S3. In step S3, the default photographing mode and the initial settings for the display and the image processing are selected before the operation proceeds to step S4.

In step S4, a decision is made as to whether or not the single shot mode has been selected as the photographing mode. If it is decided that the single shot mode has been selected as the photographing mode, an affirmative decision is made in step S4, and in this case, the operation proceeds to step S5 to execute photographing processing in the single shot mode. If, on the other hand, the single shot mode has not been selected as the photographing mode, a negative decision is made in step S4 and the operation proceeds to step S6. In step S6, a decision is made as to whether or not the continuous shooting mode has been selected as the photographing mode. If it is decided that the continuous shooting mode has been selected as the photographing mode, an affirmative decision is made in step S6 and the operation proceeds to step S7 to execute photographing processing in the continuous shooting mode. If, on the other hand, it is decided that the continuous shooting mode has not been selected as the photographing mode, a negative decision is made in step S6 and the operation proceeds to step S8. In step S8, a decision is made as to whether or not the dynamic image mode has been selected as the photographing mode. If it is decided that the dynamic image mode has been selected as the photographing mode, an affirmative decision is made in step S8 and the operation proceeds to step S9 to execute processing in the dynamic image mode. If, on the other hand, it is decided that the dynamic image mode has not been selected as the photographing mode, i.e., if the through image display mode has been selected, a negative decision is made in step S8 and the operation proceeds to step S10 to execute processing in the through image display mode.

Single Shot Mode

Figure 8:
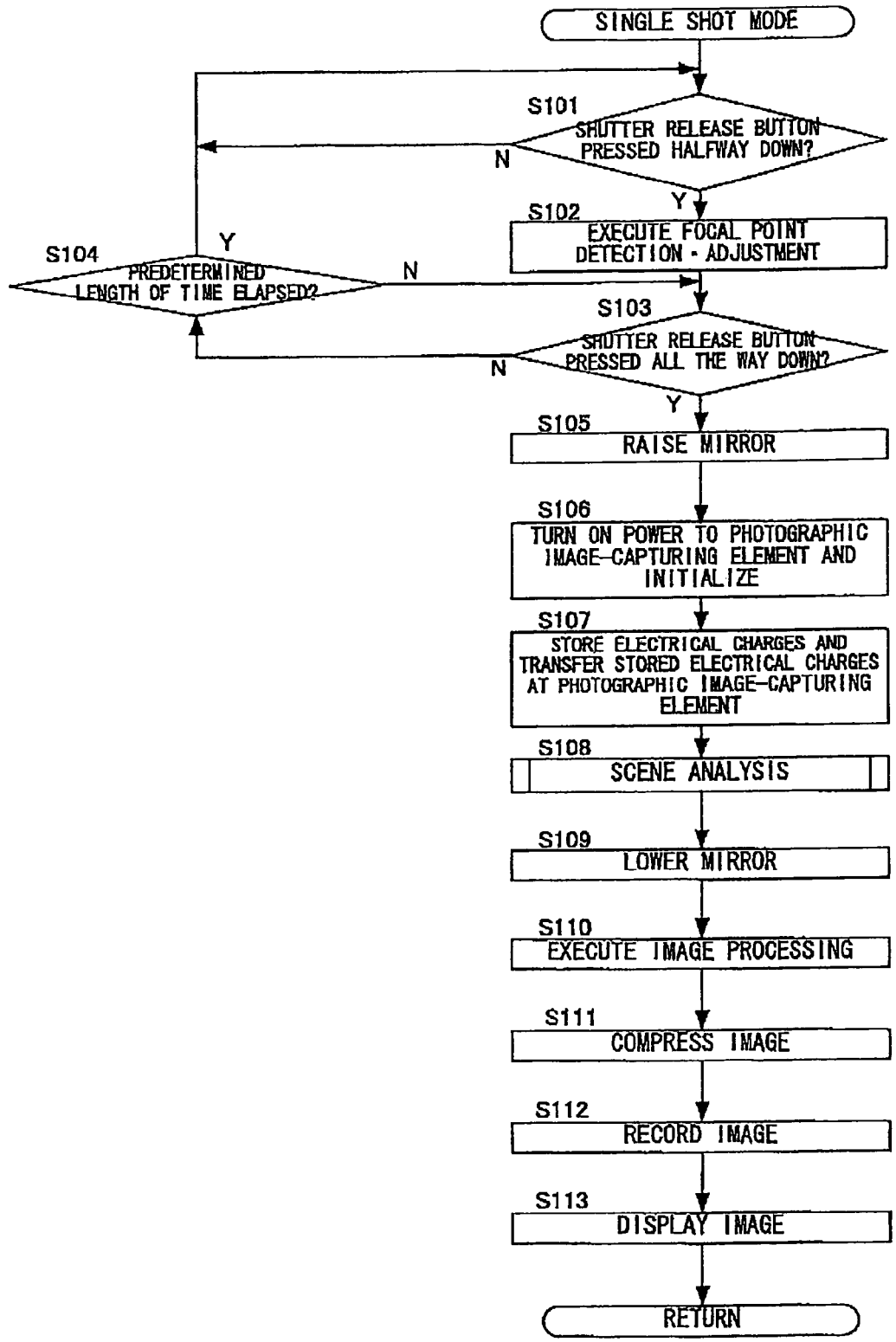
FIG. 8 presents a flowchart of the operation executed in a single shot mode in the first embodiment.

In reference to FIG. 8, the photographing processing executed in the single shot mode in step S5 is explained. In the single shot mode, image processing is executed on the photographic image based upon the scene analysis results.

In step S101, a decision is made as to whether or not the shutter release button has been pressed halfway down. If a halfway press signal has been input from the halfway press switch 47, an affirmative decision is made in step S101 to proceed to step S102, whereas if no halfway press signal has been input, a negative decision is made in step S101 to repeatedly execute the decision-making processing described above.

In step S102, the focal point detection device 49 detects the focal point adjustment state achieved via the lens 25 and the lens drive device 50 executes focal point adjustment based upon the focal point detection results. In step S103, a decision is made as to whether or not the shutter release button has been pressed all the way down. An affirmative decision is made in step S103 if a full press signal is input from the full press switch 48 to proceed to step S105, whereas a negative decision is made in step S103 if no full press signal has been input to proceed to step S104.

In step S105, a photographing sequence is started. More specifically, the mirror is made to start moving upward via a sequence device (not shown) and then the operation proceeds to step S106. In step S106, POWER ON processing is executed to supply power to the photographic image-capturing element 13 and its peripheral circuits (the AFE circuit 34, the A/D conversion circuit 35, the timing generator 32 and the driver 33) and the photographic image-capturing element 13 is initialized, before the operation proceeds to step S107.

In step S107, the photographic image-capturing element 13 is engaged to start an image-capturing operation. Namely, electrical charge storage and stored charge transfer are executed at the photographic image-capturing element 13. In step S108, the sub CPU 53 executes a scene analysis on the image data (raw data) output from the photographic image-capturing element 13. It is to be noted that the scene analysis processing is to be described in detail later in reference to the flowchart presented in FIG. 12.

In step S109, the mirror is made to start descending via the sequence device (not shown) before the operation proceeds to step S110. In step S110, the image processing circuit 30 executes the image processing (the image preprocessing and the image post processing) on the image having been captured by the photographic image-capturing element 13 based upon the results of the scene analysis having been executed in step S108.

In step S111, the image compression circuit 44 executes image compression processing on the digital image signals having undergone the image postprocessing. In step S112, the image data resulting from compression processing are recorded into the recording medium 45, and then the operation proceeds to step S113. In step S113, the display image generation circuit 42 generates display data by using the digital image signals having undergone the image preprocessing and a photographic image corresponding to the display data is reproduced and displayed at the external monitor 43. The photographing operation sequence in the single shot mode then ends.

In step S104 to which the operation proceeds after making a negative decision in step S103, a decision is made as to whether or not a predetermined length of time has elapsed since the start of the halfway press operation. An affirmative decision is made in step S104 if a state in which no halfway press signal is input from the halfway press switch 47 has been sustained over the predetermined length of time, and in this case, the operation returns to step S101. If, on the other hand, a halfway press signal has just been input from the halfway press switch 47 or the state in which no halfway press signal is input has not been sustained over the predetermined length of time, a negative decision is made in step S104 and the operation returns to step S103.

Continuous Shooting Mode

Figure 9:
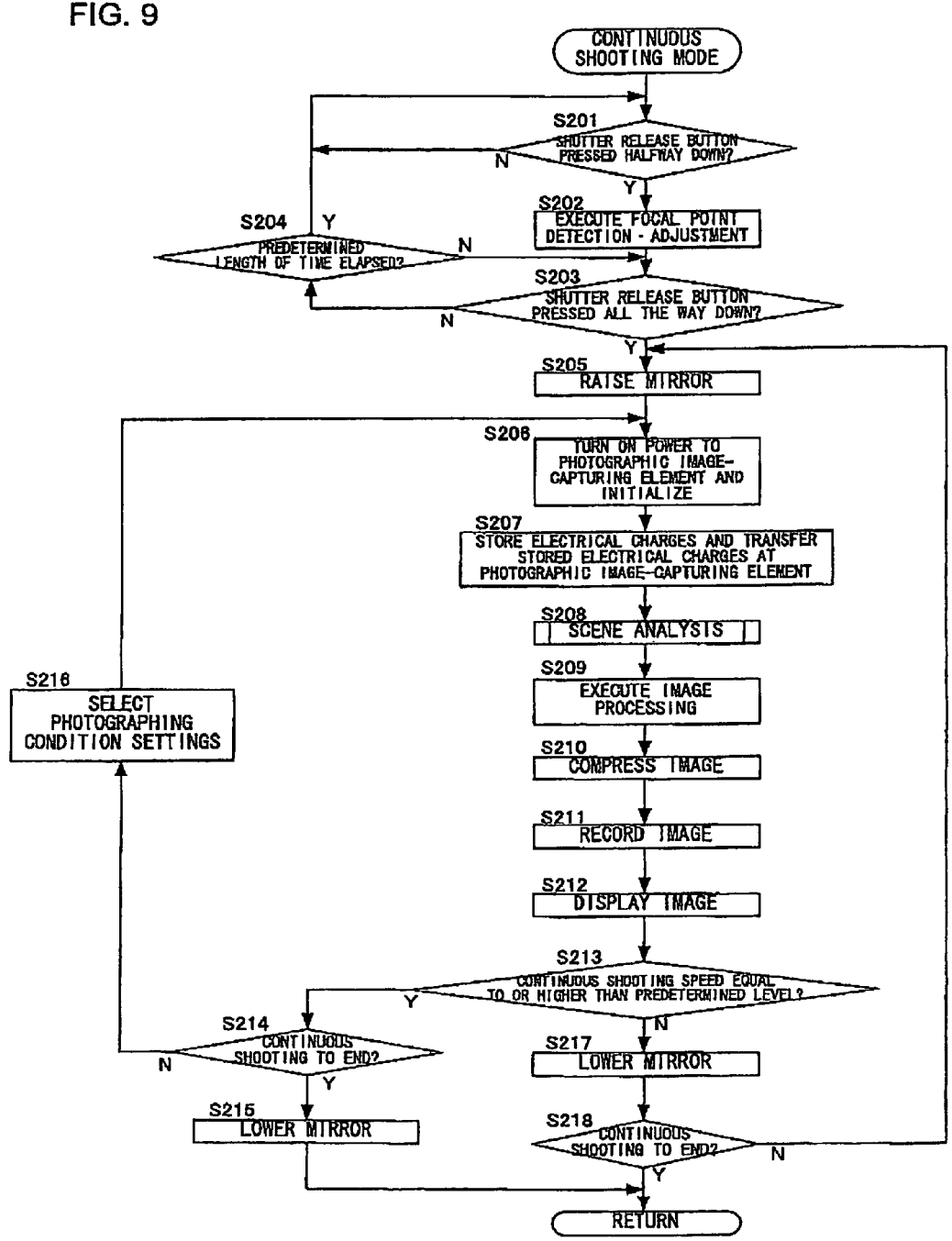
FIG. 9 presents a flowchart of the operation executed in a continuous shooting mode in the first embodiment.

The photographing processing executed in the continuous shooting mode in step S7 in FIG. 7 is now explained in reference to FIG. 9. In the continuous shooting mode, the image processing is executed on the photographic image and the photographing condition settings including the exposure value are selected for a second image or a subsequent image to be photographed, based upon the scene analysis results.

The processing executed in step S201 (decision-making with regard to whether or not the shutter release button has been pressed halfway down) through step S208 (scene analysis) is similar to the processing executed in step S101 (decision-making with regard to whether or not the shutter release button has been pressed halfway down) through step S108 (scene analysis) in FIG. 8.

In step S209, the image processing circuit 30 executes the image processing (image preprocessing and image post processing) for the image captured at the photographic image-capturing element 13 based upon the results of the scene analysis, and then the operation proceeds to step S210. In step S210, the image compression circuit 44 executes the image compression processing on the digital image signals having undergone the image postprocessing before the operation proceeds to step S211. In step S211, the image data resulting from the compression processing are recorded into the recording medium 45 and then the operation proceeds to step S212.

In step S212, the display image generation circuit 42 generates display data by using the digital image signals having undergone the image preprocessing and a photographic image corresponding to the display data is reproduced and displayed at the external monitor 43. In step S213, a decision is made as to whether or not the continuous shooting speed is equal to or higher than a predetermined level. If the continuous shooting speed is judged to be equal to or higher than the predetermined level, an affirmative decision is made in step S213 to proceed to step S214, whereas if the continuous shooting speed is judged to be lower than the predetermined level, a negative decision is made in step S213 to proceed to step S217.

In step S214, a decision is made as to whether or not the continuous shooting operation is to end. If it is decided that the continuous shooting operation is to continue, e.g., if the ON signal is continuously being output from the full press switch 48, a negative decision is made in step S214 to proceed to step S216 in which the photographing condition settings are selected based upon the results of the scene analysis having been obtained in step S208 before the operation returns to step S206. If, on the other hand, it is decided that the continuous shooting operation is to end, e.g., if the ON signal is no longer being input from the full press switch 48, an affirmative decision is made in step S214 to proceed to step S215 to lower the mirror via the sequence device (not shown) and thus end the processing sequence in the continuous shooting mode.

In step S217, to which the operation proceeds after making a negative decision in step S213, the mirror is made to start descending via the sequence device (not shown) as in step S215 and then the operation proceeds to step S218. In step S218, a decision is made as in step S214 as to whether or not the continuous shooting operation is to end. If it is decided that the continuous shooting operation is to continue, a negative decision is made in step S218 and the operation returns to step S205. If, on the other hand, the continuous shooting operation is to end, an affirmative decision is made in step S218 and the processing sequence in the continuous shooting mode ends.

Dynamic Image Mode

Figure 10:
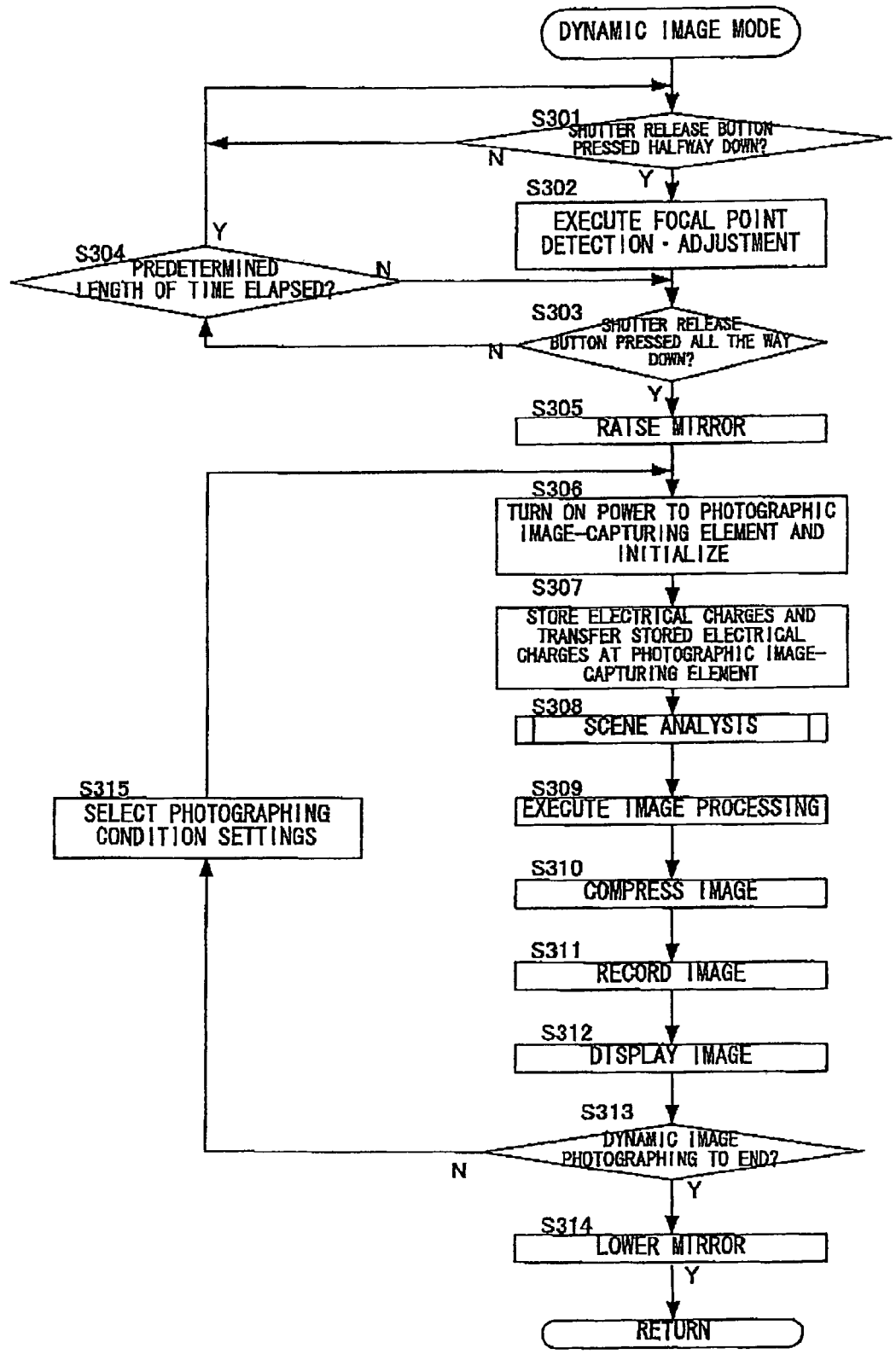
FIG. 10 presents a flowchart of the operation executed in a dynamic image mode in the first embodiment.

FIG. 10 shows the processing executed in the dynamic image mode in step S9 in FIG. 7. In the dynamic image mode, too, the image processing is executed for the photographic image and also the photographing condition settings such as the exposure value for a subsequent image to be photographed are selected, based upon the results of the scene analysis, as in the continuous shooting mode.

It is to be noted that the processing executed in step S301 (decision-making with regard to whether or not the shutter release button has been pressed halfway down) through step S312 (image display) is similar to the processing executed in step S201 (decision-making with regard to whether or not the shutter release button has been pressed halfway down) through step S212 (image display) in the continuous shooting mode, as shown in FIG. 9. In step S313, a decision is made as to whether or not the dynamic image photographing operation is to end. If the dynamic image photographing operation is to continue, a negative decision is made in step S313 to proceed to step S315 in which the photographing condition settings are selected based upon the scene analysis results obtained through the processing executed in step S308 as in step S216 in the continuous shooting mode shown in FIG. 9, and then the operation returns to step S306. If, on the other hand, the dynamic image photographing operation is to end, an affirmative decision is made in step S313 to proceed to step S314 in which the mirror is made to descend via the sequence device (not shown) before ending the operational sequence.

Through Image Mode

Figure 11:
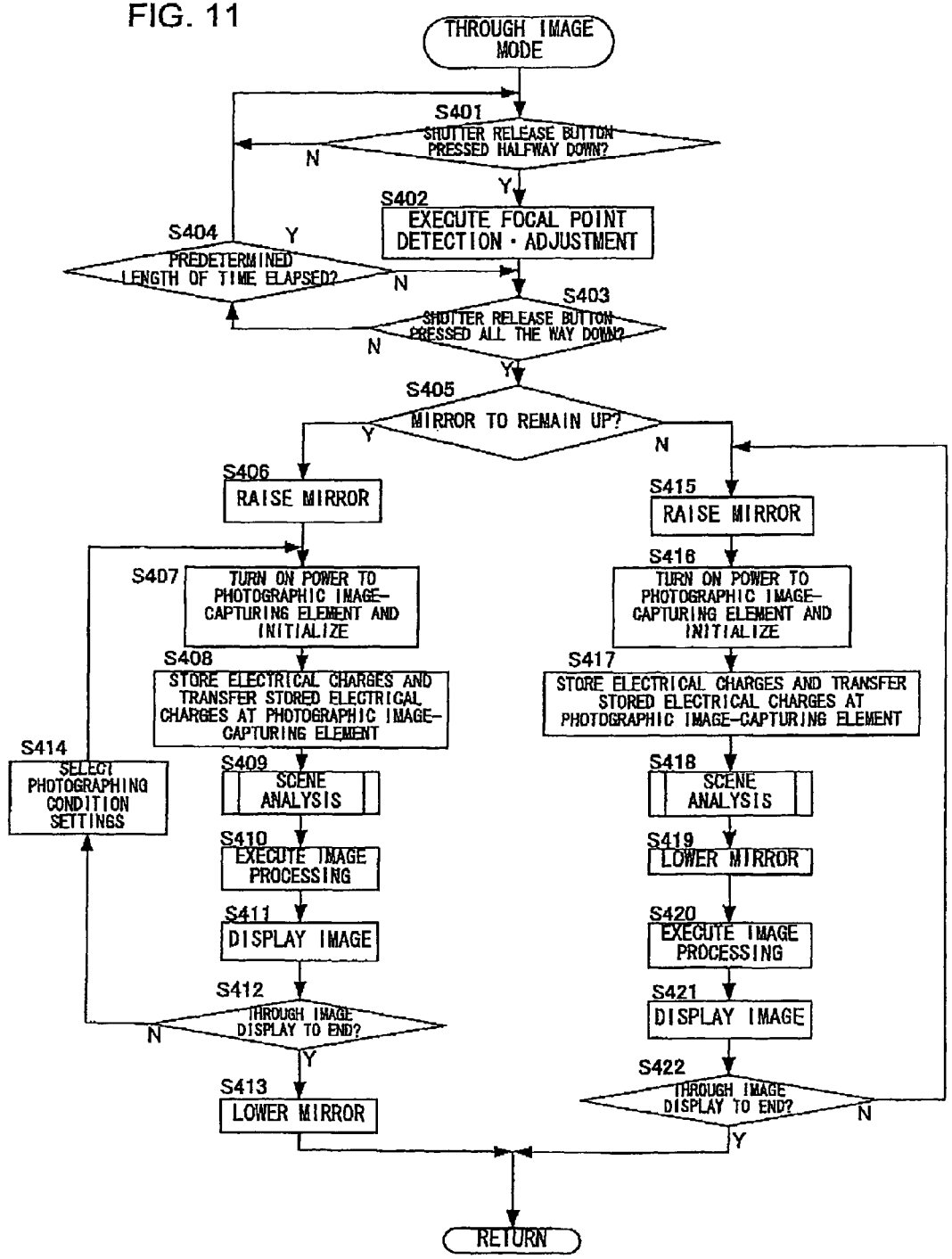
FIG. 11 presents a flowchart of the operation executed in a through image display mode in the first embodiment.

FIG. 11 shows the processing executed in the through image display mode in step S10 in FIG. 7. When the through image display is brought up by holding the quick-return mirror 11 at the UP position indicated by the solid line in FIG. 1 in the through image display mode, the image display processing is executed for the display image based upon the results of the scene analysis and also the photographing condition settings such as the exposure value for a second or subsequent image to be brought up on display are selected, based upon the scene analysis results. When the through image display is brought up by driving the quick-return mirror 11 up/down in correspondence to each frame, the image processing is executed for the display image based upon the results of the scene analysis.

The processing executed in step S401 (decision-making with regard to whether or not the shutter release button has been pressed halfway down) through step S404 (decision-making with regard to the length of time over which the shutter release button has been held halfway down) is similar to the processing executed in step S301 (decision-making with regard to whether or not the shutter release button has been pressed halfway down) through step S304 (decision-making with regard to the length of time over which the shutter release button has been held halfway down) in the dynamic image mode as shown in FIG. 10. In step S405 to which the operation proceeds after making an affirmative decision in step S404, a decision is made as to whether or not to display a through image while holding the quick-return mirror 11 at the UP position indicated by the solid line in FIG. 1. If the display is to be brought up by holding the quick-return mirror 11 at the UP position, an affirmative decision is made in step S405 and the operation proceeds to step S406. If, on the other hand, the display is to be brought up by driving the quick-return mirror 11 up/down for each frame, a negative decision is made in step S405 and the operation proceeds to step S415.

The processing executed from step S406 (mirror up) through step S410 (image processing) is similar to the processing executed in step S305 (mirror up) through step S309 (image processing) in the dynamic image mode as shown in FIG. 10. In step S411, a through image is displayed at the external monitor 43 via the display image generation circuit 42 and then the operation proceeds to step S412. In step S412, a decision is made as to whether or not to continue the through image display. If the through image display is to end, an affirmative decision is made in step S412 and the operation proceeds to step S413 to lower the quick-return mirror 11 and end the processing sequence. If the through image display is to continue, a negative decision is made in step S412 to proceed to step S414 in which the photographing condition settings are selected based upon the results of the scene analysis having been obtained in step S409 as in step S315 in the dynamic image mode in FIG. 10, before the operation returns to step S407.

The processing executed in step S415 (mirror up) through step S420 (image processing) after making a negative decision in step S405 is similar to the processing executed in step S105 (mirror up) through step S110 (image processing) in the single shot mode as shown in FIG. 8. In step S421, a through image is displayed at the external monitor 43 via the display image generation circuit 42 as in step S411. In step S422, a decision is made as to whether or not to continue the through image display, as in step S412. If the through image display is to end, an affirmative decision is made in step S422 and the processing sequence ends. If the through image display is to continue, a negative decision is made in step S422 and the operation returns to step S415.

Scene Analysis Processing

Figure 12:
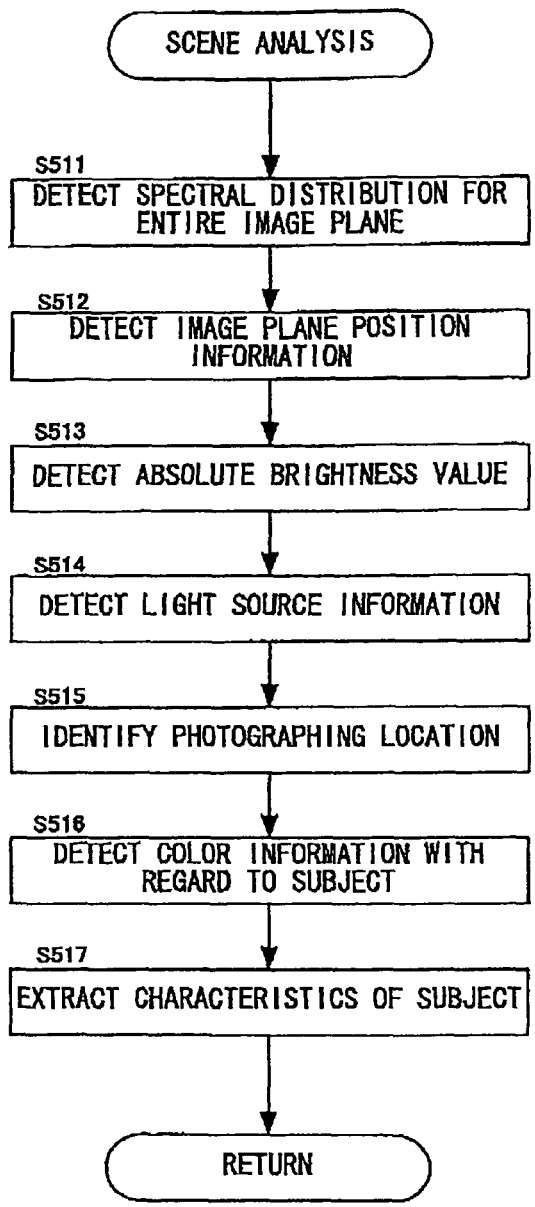
FIG. 12 presents a flowchart of the scene analysis processing operation executed in the embodiment.

The scene analysis processing executed in step S108 in FIG. 8, step S208 in FIG. 9, step S308 in FIG. 10 and steps S409 and S418 in FIG. 11 is explained in reference to the flowchart presented in FIG. 12. It is to be noted that the program in conformance to which the processing shown in FIG. 12 proceeds is executed by the sub CPU 53.

In step S511, the processing unit 54 detects the spectral distribution manifesting over the entire area of the photographic image and then the operation proceeds to step S512. In step S512, the processing unit 54 detects the spectral distribution manifesting over each block area before the operation proceeds to step S513. In step S513, the processing unit 54 calculates the absolute brightness value in correspondence to each block area and then the operation proceeds to step S514.

In step S514, the scene analysis unit 55 detects the color temperature of the photographic image, i.e., the light source information, based upon the spectral distribution over the entire area of the photographic image having been detected in step S511 by referencing the table stored in the database 56. In the following step S515, the scene analysis unit 55 identifies the specific photographing locale based upon the absolute brightness values having been calculated in step S513 and the photographing information related to the photographing location and the photographing time, and then the operation proceeds to step S516.

In step S516, the scene analysis unit 55 detects color information related to the color of the photographic subject based upon the spectral distributions in the individual block areas having been detected in step S512, and then the operation proceeds to step S517. In step S517, the scene analysis unit 55 extracts feature of the subject based upon the spectral distribution over the entire area of the photographic image having been detected in step S511 and the spectral distributions manifesting in the individual block areas having been detected in step S512 by referencing the table stored in the database 56.

In the field indicated by reference numeral 151 in FIG. 24, each photographing mode that may be selected in the first embodiment and the corresponding processing executed in the photographing mode is listed.

In the single shot mode, the scene analysis results are reflected in the image processing executed on the photographic image. In the continuous shooting mode, the dynamic image mode and the through image display mode, the image processing is executed on the photographic image or the display image based upon the scene analysis results and also the photographing condition settings such as the exposure value for a subsequent image are selected based upon the scene analysis results.

The following advantages are achieved in the electronic camera in the first embodiment described above.

(1) As the photographic image-capturing element 13 outputs digital image signals representing a plurality of color components, the sub CPU 53 executes scene analysis for a photographic image by using a digital image signal output (raw data) with linearity. Thus, the processing can be completed faster than scene analysis processing executed by first converting digital image signals to image data.

(2) The sub CPU 53 executes scene analysis by calculating color continuity manifesting over the entire area of the photographic image based upon a discrete spectral distribution of the plurality of color components represented in the digital image signals. Thus, the light source of the light illuminating the photographic image can be determined through scene analysis executed by using the raw data.

(3) The sub CPU 53 executes scene analysis based upon continuity manifesting in the spectral characteristics over the entire photographic image and continuity manifesting in spectral characteristics in small areas defined by dividing the entire photographic image. Thus, an achromatic area in the photographic image can be extracted through scene analysis executed by using the raw data.

(4) The sub CPU 53 executes scene analysis based upon discrete spectral characteristics of the individual color components, R, G and B, manifesting over the entire photographic image and discrete spectral characteristics of the R, G and B color components manifesting in small areas defined by dividing the entire photographic image. Thus, characteristics of the color in a small area can be extracted by ascertaining the inherent spectral reflectance manifesting in the small area based upon the spectral characteristics of the small area affected by the particular light source through scene analysis executed on the raw data.

(5) The sub CPU 53 executes scene analysis by calculating an absolute brightness value over the entire photographic image based upon the brightness values calculated in correspondence to the individual color components, R, G and B, for the entire area of the photographic image. This makes it possible to estimate the photographing location, e.g., an indoors location or an outdoors location, based upon the absolute brightness value.

(6) The sub CPU 53 executes scene analysis by using the color temperature and the absolute brightness value for the overall photographic image. Thus, the photographing conditions, e.g., the image has been photographed indoors, illuminated with a fluorescent lamp or an incandescent lamp, can be estimated.

(7) The main CPU 31 calculates the optimal photographing condition settings such as the optimal exposure value based upon the results of the scene analysis executed by using raw data output from the photographic image-capturing element 13.

This feature, which allows the scene analysis to be executed without having to convert digital image signals to image data and thus allows the processing to be completed more quickly, is effective in, for instance, the continuous shooting mode in which the photographing condition settings must be determined through arithmetic operation quickly.

(8) Since the sub CPU 53 executes scene analysis by using the data output from the photographic image-capturing element 13, the image processing circuit 30 is able to reflect the scene analysis results in the image processing that it executes on an image obtained through a single shot photographing operation. In addition, the image processing circuit 30 is able to reflect the scene analysis results in the image processing that it executes on images obtained through a continuous shooting operation and a dynamic image photographing operation and on an image to be brought up in a through image display, and also, the main CPU 31 is able to select the optimal photographing condition settings for subsequent images by using the analysis results.

Second Embodiment

Figure 13:
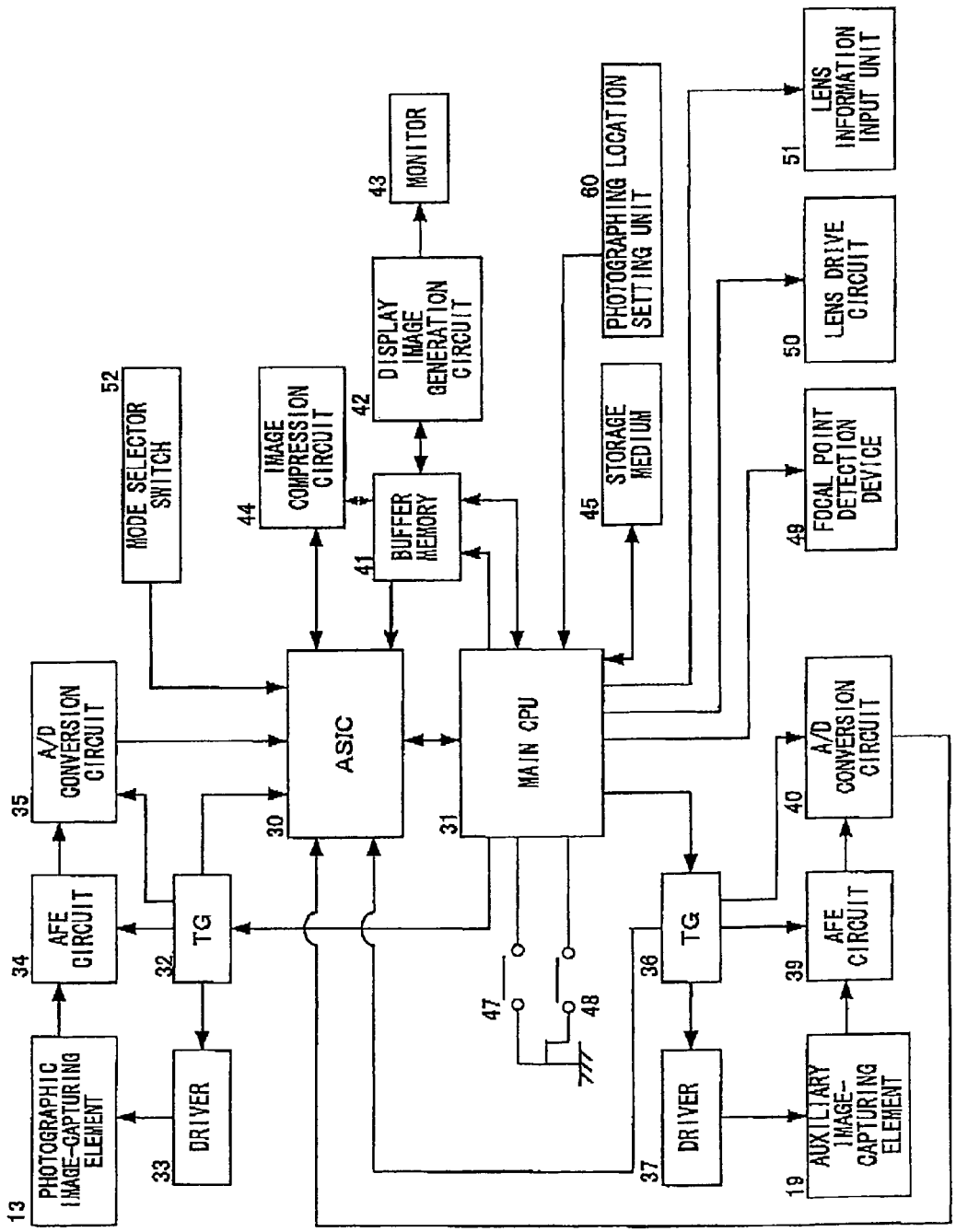
FIG. 13 is a block diagram of the circuit structure adopted in the single lens reflex electronic camera achieved in a second embodiment of the present invention.

FIG. 13 is a block diagram showing the circuit structure of the electronic camera achieved in the second embodiment assuming the essential structure shown in FIG. 1, which executes scene analysis by using image data (raw data) constituted with auxiliary image signals output from the auxiliary image-capturing element 19. The following explanation focuses on differences from the circuit structure adopted in the first embodiment shown in FIG. 2.

A timing generator (TG) 36 generates a timing signal in response to a command output from the main CPU 31 and provides the timing signal to a driver 37, an AFE circuit 39 and an A/D conversion circuit 40. The driver 37 generates a drive signal to be used to engage the auxiliary imaging element 19 in electrical charge storage and then in transfer of the stored electrical charges by using the timing signal and provides the drive signal thus generated to the auxiliary image-capturing element 19. The AFE circuit 39 executes analog processing (such as gain control) on photoelectric conversion signals (stored electrical charges) output from the auxiliary image-capturing element 19. The A/D conversion circuit 40 converts the imaging signals having undergone the analog processing to digital signals. The raw data constituted with these digital signals are output to the main CPU 31 which then executes scene analysis by using the raw data input thereto.

The main CPU 31 executes scene analysis based upon the raw data originating from the auxiliary image-capturing element 19, which are input thereto from the A/D conversion circuit 40, selects the photographing condition settings based upon the scene analysis results in the single shot mode, the continuous shooting mode, the dynamic image mode and the through image display mode, and outputs the scene analysis results to the image processing circuit 30. The image processing circuit 30 executes image processing on the digital image signals input thereto from the A/D conversion circuit 35. It is to be noted that scene analysis is executed by adopting a method similar to that adopted in the sub CPU 53 in the first embodiment.

The photographing operation processing executed in the electronic camera achieved in the second embodiment structured as described above is now explained. In the second embodiment, the photographing condition settings are selected based upon the scene analysis results when the single shot mode has been selected via the mode selector switch 52, and image processing is executed for the photographic images or the display image, as well as selecting the photographing condition settings, based upon the scene analysis results when the continuous shooting mode or the through image display mode has been selected via the mode selector switch 52. When the dynamic image mode has been selected, the photographing condition settings are selected and image processing is executed for the photographic images based upon the scene analysis executed by obtaining the first photographic image. It is to be noted that image processing may be executed based upon the scene analysis results in the single shot mode as well. In such a case, the image processing should be executed on image data output from the photographic image-capturing element 13 based upon the results of the scene analysis executed by using image data output from the auxiliary image-capturing element 19 before the quick-return mirror 11 rotates to the UP position in FIG. 1.

Single Shot Mode

Figure 14:
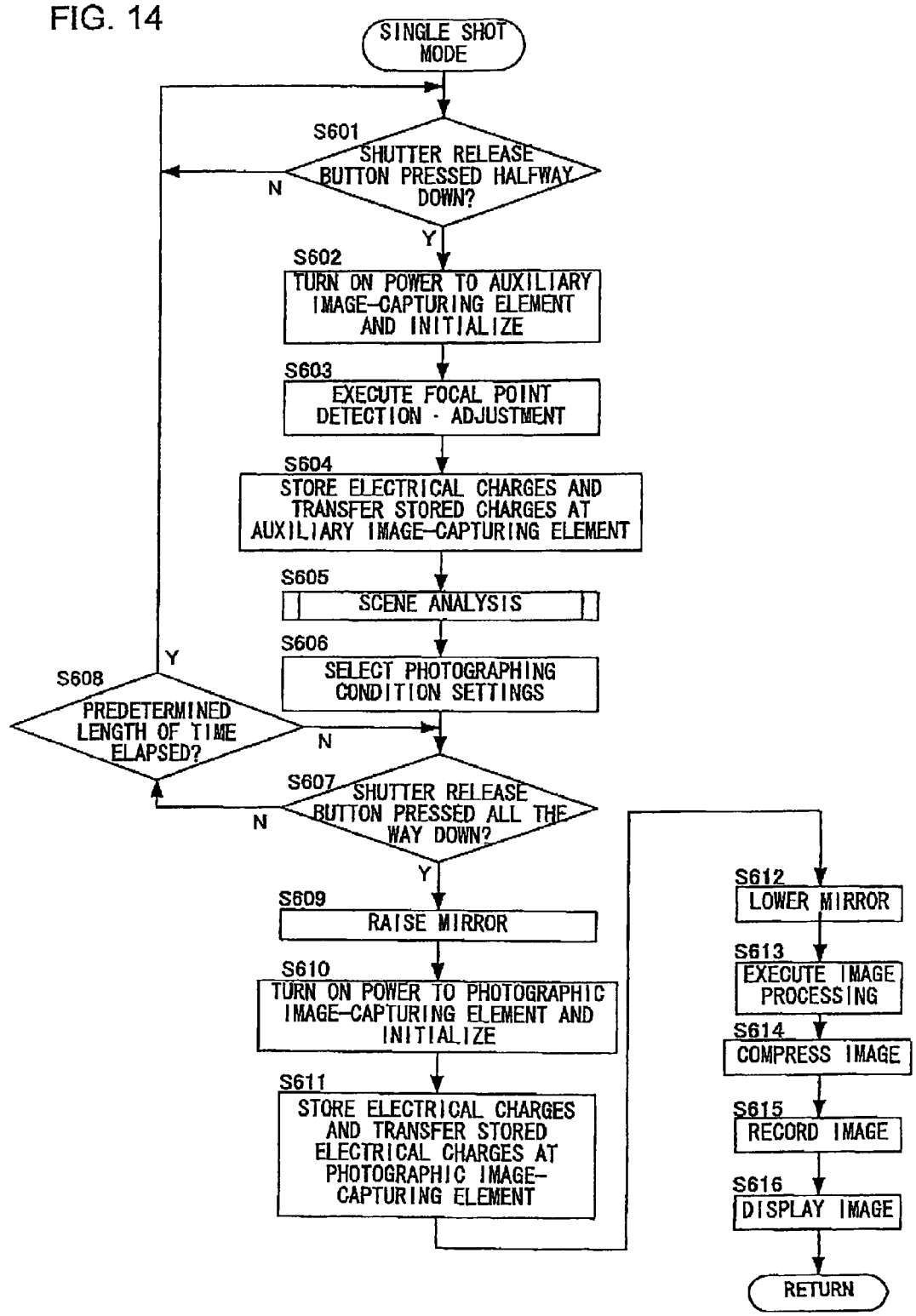
FIG. 14 presents a flowchart of the operation executed in the single shot mode in the second embodiment.

In reference to the flowchart presented in FIG. 14, the photographing operation executed in the single shot mode is explained by focusing on the processing, which differs from that shown in the flowchart presented in FIG. 8.

In step S602 to which the operation proceeds after making an affirmative decision with regard to a halfway press operation of the shutter release button in step S601, POWER ON processing is executed to supply power to the auxiliary image-capturing element 19 and its peripheral circuits (the AFE circuit 39, the A/D conversion circuit 40, the timing generator 36 and the driver 37) and the auxiliary image-capturing element 19 is initialized before the operation proceeds to step S603.

In step S604 to which the operation proceeds after executing focal point detection and adjustment in step S603 as in step S102 in FIG. 8, an imaging operation at the auxiliary image-capturing element 19 starts. Namely, electrical charges are stored and the stored charges are transferred at the auxiliary image-capturing element 19. In step S605, the main CPU 31 executes scene analysis on image data (raw data) output from the auxiliary image-capturing element 19. It is to be noted that since the details of the scene analysis processing are similar to those in the flowchart presented in FIG. 12, their explanation is omitted.

In step S606, the photographing condition settings are selected based upon the results of the scene analysis having been executed in step S605, and then the operation proceeds to step S607. The processing executed in step S607 (decision-making with regard to whether or not the shutter release button has been pressed all the way down) through step S611 (electrical charge storage and transfer at the photographic image-capturing element 13) is similar to the processing executed in step S103 (decision-making with regard to whether or not the shutter release button has been pressed all the way down) through step S107 (electrical charge storage and transfer at the photographic image-capturing element 13) in FIG. 8. In addition, the processing executed in step S612 (mirror down) through step S616 (image display) is similar to the processing executed in step S109 (mirror down) through step S113 (image display) in FIG. 8. It is also to be noted that the image processing is executed in step S613 by using the scene analysis results obtained in step S605 immediately before the shutter release button is pressed all the way down.

Continuous Shooting Mode

Figure 15:
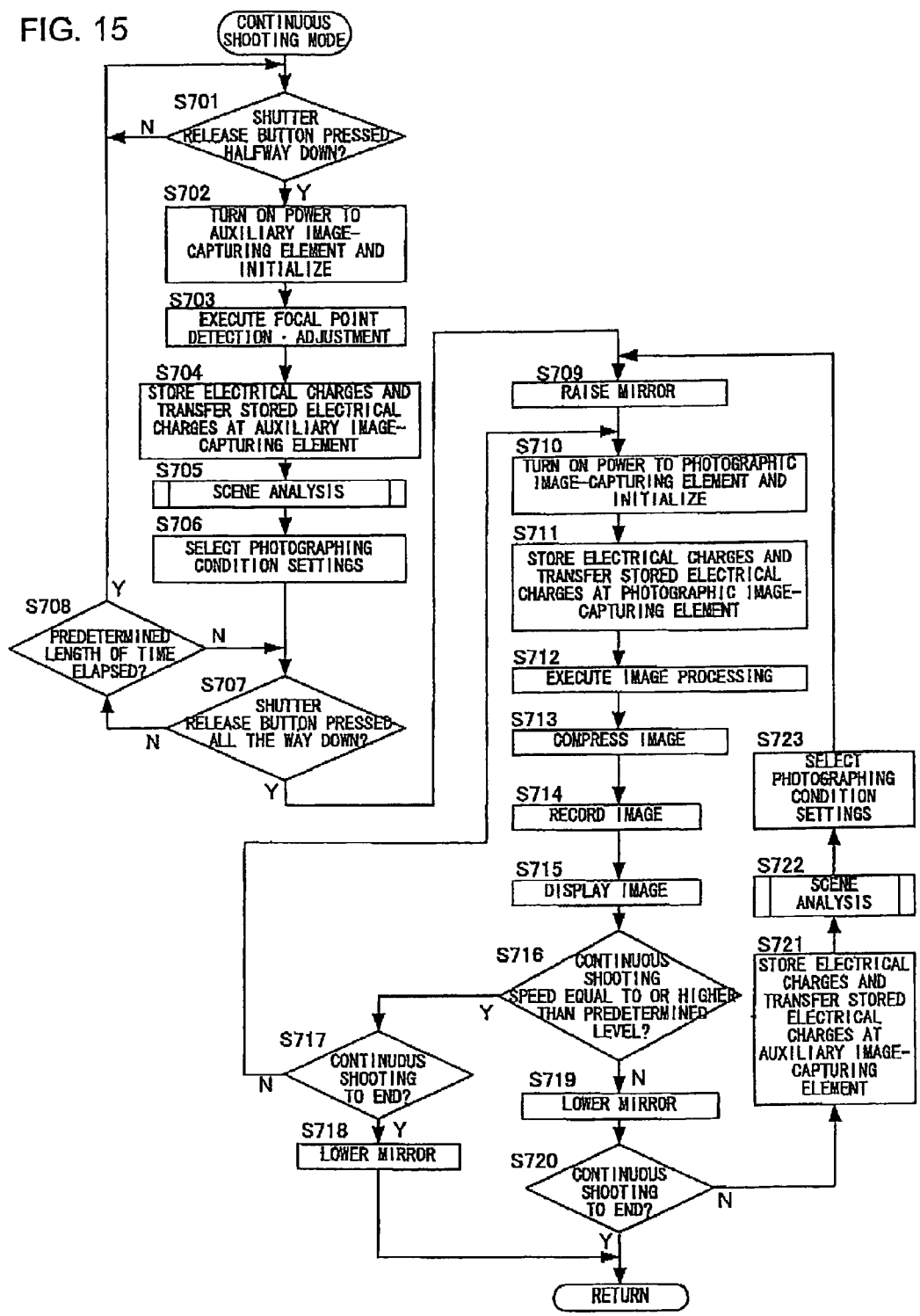
FIG. 15 presents a flowchart of the operation executed in the continuous shooting mode in the second embodiment.

In reference to the flowchart presented in FIG. 15, the photographing operation executed in the continuous shooting mode is explained. In the continuous shooting mode, the photographing condition settings are selected and the image processing for the photographic image is executed based upon the scene analysis results.

The processing executed in step S701 (decision-making with regard to whether or not the shutter release button has been pressed halfway down) through step S711 (electrical charge storage and transfer at the photographic image-capturing element 13) in FIG. 15 is similar to the processing executed in step S601 (decision-making with regard to whether or not the shutter release button has been pressed halfway down) through step S611 (electrical charge storage and transfer at the photographic imaging element 13) in the single shot mode as shown in FIG. 14. In addition, the processing executed in step S712 (image processing) through step S718 (mirror down) in FIG. 15 is similar to the processing executed in step S209 (image processing) through step S215 (mirror down) in FIG. 9. It is also to be noted that the image processing is executed in step S712 by using the scene analysis results obtained in step S705 or the scene analysis results obtained in step S722.

As in steps S217 and S218 in FIG. 9, the quick-return mirror 11 is lowered and then a decision is made as to whether or not the continuous shooting operation is to end in steps S719 and S720 in FIG. 15. If the continuous shooting operation is to continue, a negative decision is made in step S720 and the operation proceeds to step S721. The processing executed in step S721 (electrical charge storage and transfer at the auxiliary image-capturing element 19) through step S723 (photographing condition setting selection) is similar to the processing executed in step S704 (electrical charge storage and transfer at the auxiliary image-capturing element 19) through step S706 (photographing condition setting selection).

Dynamic Image Mode

Figure 16:
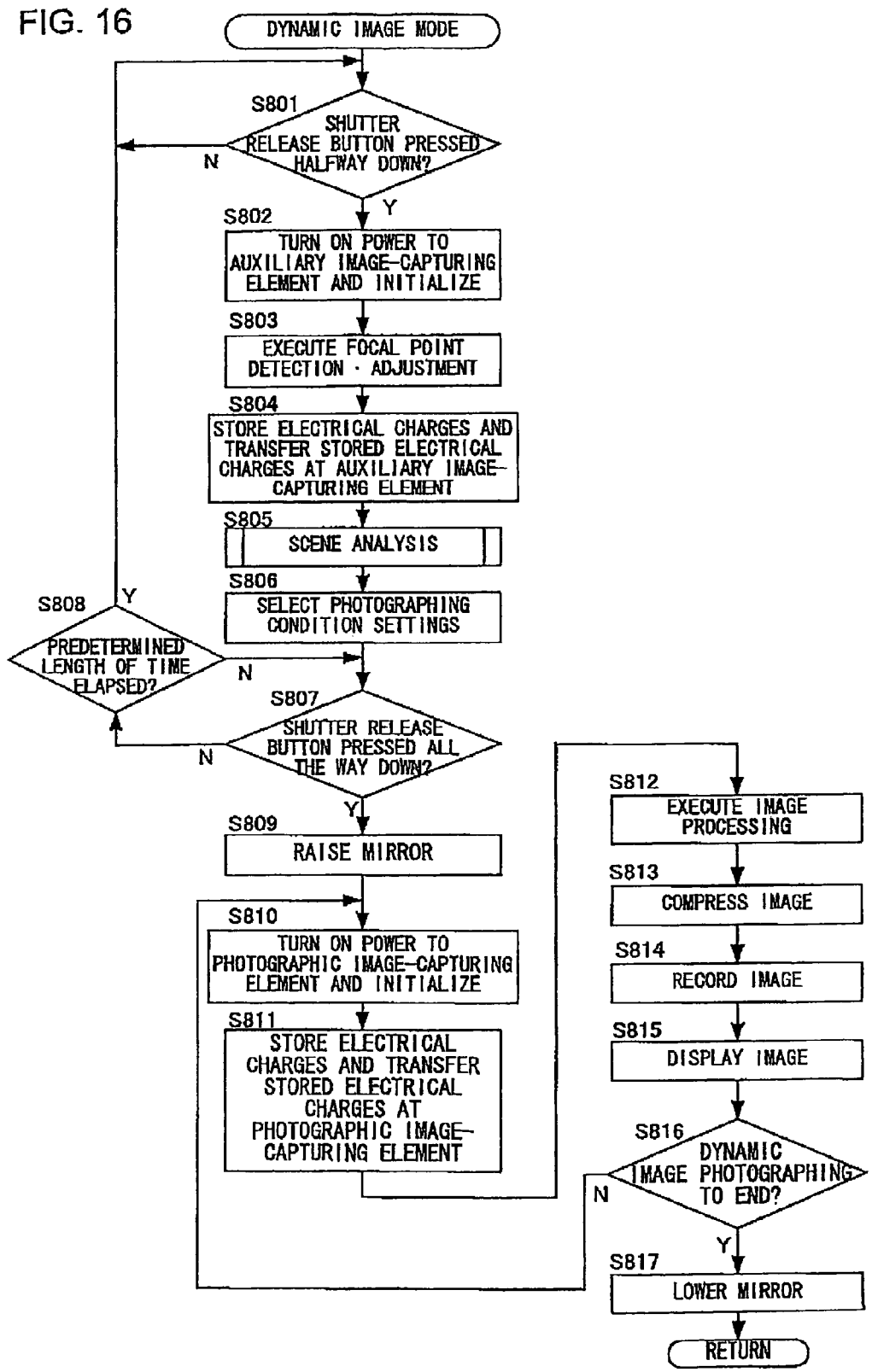
FIG. 16 presents a flowchart of the operation executed in the dynamic image mode in the second embodiment.

In reference to the flowchart presented in FIG. 16, the photographing operation executed in the dynamic image mode is explained. In the dynamic image mode, the photographing condition settings are selected and the image processing for the photographic image is executed based upon the results of the scene analysis executed when the first photographic image is obtained.

The processing executed in step S801 (decision-making with regard to whether or not the shutter release button has been pressed halfway down) through step S815 (image display) in FIG. 16 is similar to the processing executed in step S701 (decision-making as to whether or not the shutter release button has been pressed halfway down) through step S715 (image display) in the continuous shooting mode as shown in FIG. 15. It is to be noted that the image processing is executed in step S812 by using the results of the scene analysis having been executed in step S805. In addition, the processing executed in step S816 (decision-making as to whether or not the dynamic image photographing operation is to end) through step S817 (mirror down) in FIG. 16 is similar to the processing executed in step S313 (decision-making as to whether or not the dynamic image photographing operation is to end) through step S314 (mirror down) in FIG. 10.

Through Image Mode

Figure 17:
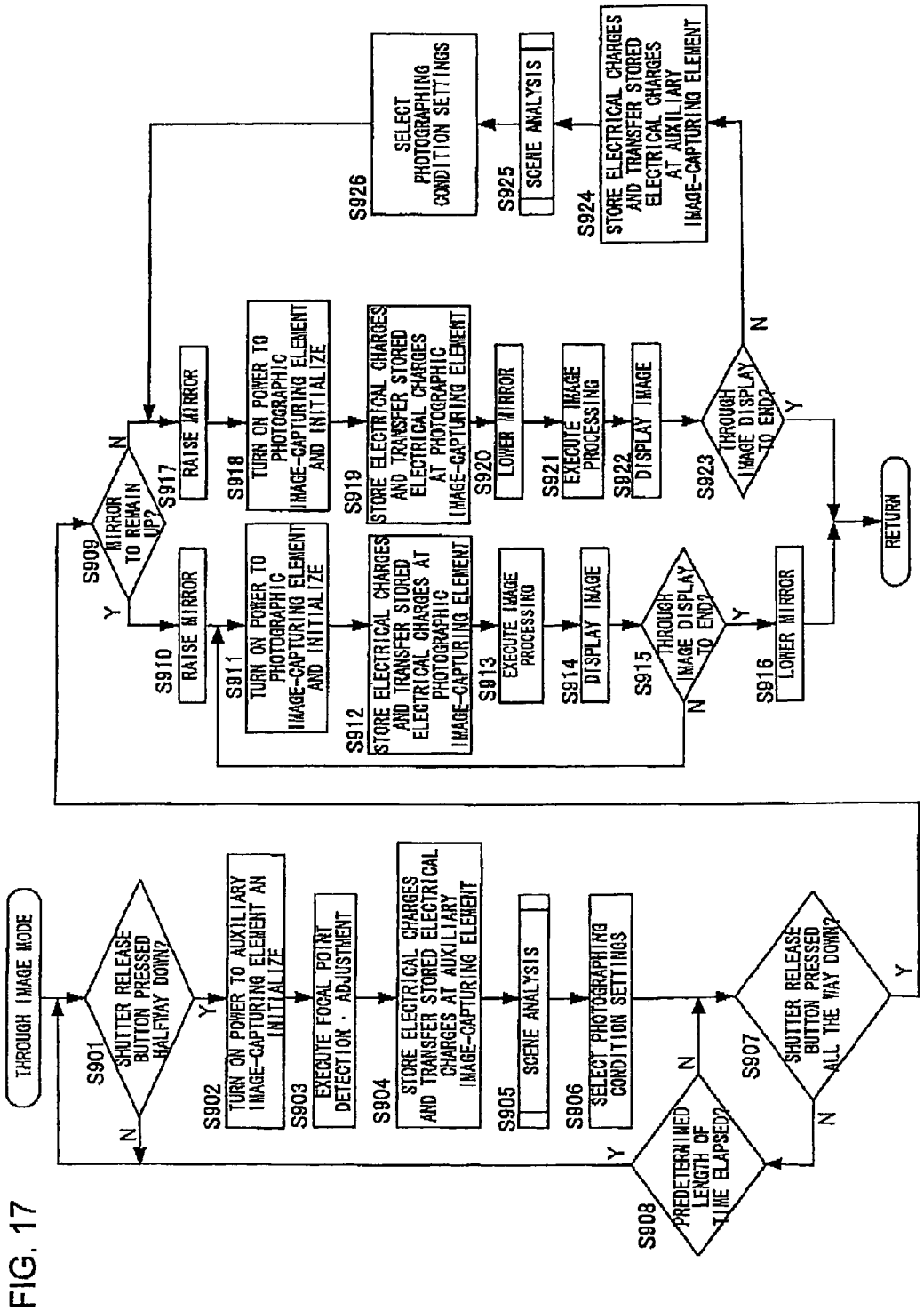
FIG. 17 presents a flowchart of the operation executed in the through image display mode in the second embodiment.

In reference to the flowchart presented in FIG. 17, the operation executed in the through image display mode is explained. In the through image display mode, the photographing condition settings are selected and the image processing for the display image is executed based upon the results of the scene analysis.

The processing executed in step S901 (decision-making as to whether or not the shutter release button has been pressed halfway down) through step S908 (decision-making with regard to the length of time over which the shutter release button has been held halfway down) in FIG. 17 is similar to the processing executed in step S801 (decision-making with regard to whether or not the shutter release button has been pressed halfway down) through step S808 (decision-making with regard to the length of time over which the shutter release button has been held halfway down) in the dynamic image mode as shown in FIG. 16.

In step S909, a decision is made as to whether or not to bring up the through image display by holding the quick-return mirror 11 at the UP position indicated by the solid line in FIG. 1, as in step S405 in FIG. 11. If the display is to be brought up by holding the quick-return mirror 11 at the UP position, an affirmative decision is made in step S909 and the operation proceeds to step S910. If, on the other hand, the display is to be brought up by driving the quick-return mirror 11 up/down for each frame, a negative decision is made in step S909 and the operation proceeds to step S917.

The processing executed in step S910 (mirror up) through step S913 (image processing) is similar to the processing executed in step S809 (mirror up) through step S812 (image processing) in the dynamic image mode as shown in FIG. 16. It is to be noted that the image processing is executed in step S913 by using the scene analysis results obtained in step S905. In step S914, a through image is brought up on display at the external monitor 43 via the display image generation circuit 42, and then the operation proceeds to step S915. In step S915, a decision is made as to whether or not to exit the through image display mode. If the through image display mode is to continue, a negative decision is made in step S915 and the operation returns to step S911. If, on the other hand, the through image display mode is to end, an affirmative decision is made in step S915 and in this case, the operation proceeds to step S916 to lower the quick-return mirror 11 and end the processing sequence.

The processing executed in step S917 (mirror up) through step S921 (image processing) after making a negative decision in step S909 is similar to the processing executed in step S609 (mirror up) through step S613 (image processing) in the single shot mode as shown in FIG. 14. It is to be noted that the image processing is executed in step S921 for the first image by using the scene analysis results obtained in step S905 and for any subsequent image by using the scene analysis results obtained in step S925. In step S922, a through image is brought up on display at the external monitor 43 via the display image generation circuit 42 as in step S913, and then the operation proceeds to step S923.

In step S923, a decision is made as to whether or not to exit the through image display mode as in step S915. If the through image display mode is to end, an affirmative decision is made in step S923 and the processing sequence ends. If, on the other hand, the through image display mode is to continue, a negative decision is made in step S923 and the operation proceeds to step S924. The processing executed in step S924 (electrical charge storage and transfer at the auxiliary image-capturing element 19) through step S926 (photographing condition setting selection) is similar to the processing executed in step S904 (electrical charge storage and transfer at the auxiliary image-capturing element 19) through step S906 (photographing condition setting selection).

In the field indicated by reference numeral 152 in FIG. 24, each of the photographing modes that may be selected in the second embodiment and the corresponding processing executed in the photographing mode is listed.

In the single shot mode, the main CPU 31 selects the photographing condition settings based upon the scene analysis results. In addition, the image processing circuit 30 executes image processing for a photographic image based upon the results of the scene analysis having been executed prior to raising the mirror. In the continuous shooting mode or the through image display mode, the main CPU 31 selects the photographing condition settings based upon the scene analysis results and the image processing circuit 30 executes the image processing for the photographic image or the display image based upon the results of the scene analysis. In the dynamic image mode, the main CPU 31 selects the photographing condition settings and the image processing circuit 30 executes the image processing based upon the results of the scene analysis executed when the first image is obtained.

In addition to the advantages (2) through (6) achieved in the first embodiment, the electronic camera in the second embodiment described above provides the following advantages.

(1) As digital image signals representing a plurality of color components output from the auxiliary image-capturing element 19, the main CPU 31 executes scene analysis for a photographic image by using a digital image signal output (raw data) with linearity. Thus, the processing can be completed faster than scene analysis processing executed by first converting digital image signals to image data.

(2) The main CPU 31 determines through arithmetic operation the optimal photographing condition settings such as the optimal exposure value based upon the results of the scene analysis executed by using raw data output from the auxiliary image-capturing element 19. Since this feature allows the scene analysis processing to be completed without having to convert digital image signals to image data, the overall processing time is reduced. In addition, the results of the scene analysis executed by using the data output from the auxiliary image-capturing element 19 can be utilized when determining through arithmetic operation the photographing condition settings for the first image in the single shot mode, the continuous shooting mode, the dynamic image mode and the through image display mode.

(3) Based upon the results of the scene analysis executed by using raw data output from the auxiliary image-capturing element 19, the image processing circuit 30 executes image processing for data output from the photographic image-capturing element 13. This feature, which allows the scene analysis to be executed without having to first convert digital image signals to image data and thus allows the processing to be completed more quickly, is effective in, for instance, the continuous shooting mode in which the photographing condition settings must be determined quickly through arithmetic operation.

(4) Since the main CPU 31 executes the scene analysis based upon raw data provided from the auxiliary image-capturing element 19 equipped with a smaller number of pixels than the photographic image-capturing element 13, the processing can be completed more quickly.

Third Embodiment

Figure 18:
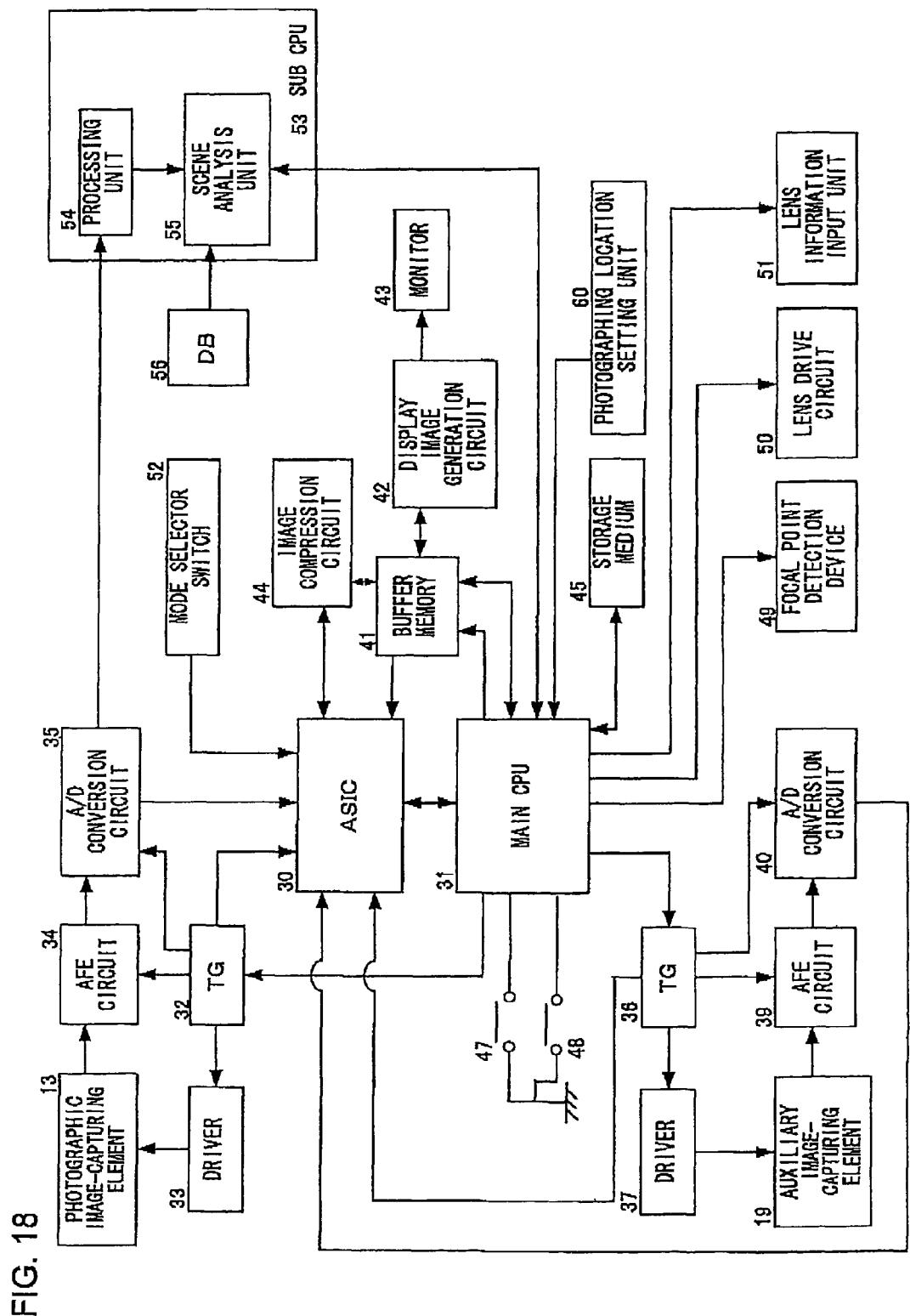
FIG. 18 is a block diagram of the circuit structure adopted in the single lens reflex electronic camera achieved in a third embodiment of the present invention.

FIG. 18 is a block diagram showing the circuit structure adopted in the electronic camera achieved in the third embodiment assuming the essential structure shown in FIG. 1, which executes scene analysis by using image data (raw data) output from the photographic image-capturing element 13 and the auxiliary image-capturing element 19. The electronic camera achieved in the third embodiment includes a sub CPU 53 as does the electronic camera achieved in the first embodiment and the sub CPU 53 executes scene analysis by using image data (raw data) constituted with photographic image signals output from the photographic image-capturing element 13. In addition, the main CPU 31 in the electronic camera executes scene analysis by using image data (raw data) constituted with auxiliary image signals output from the auxiliary image-capturing element 19, as in the second embodiment.

Figure 19:
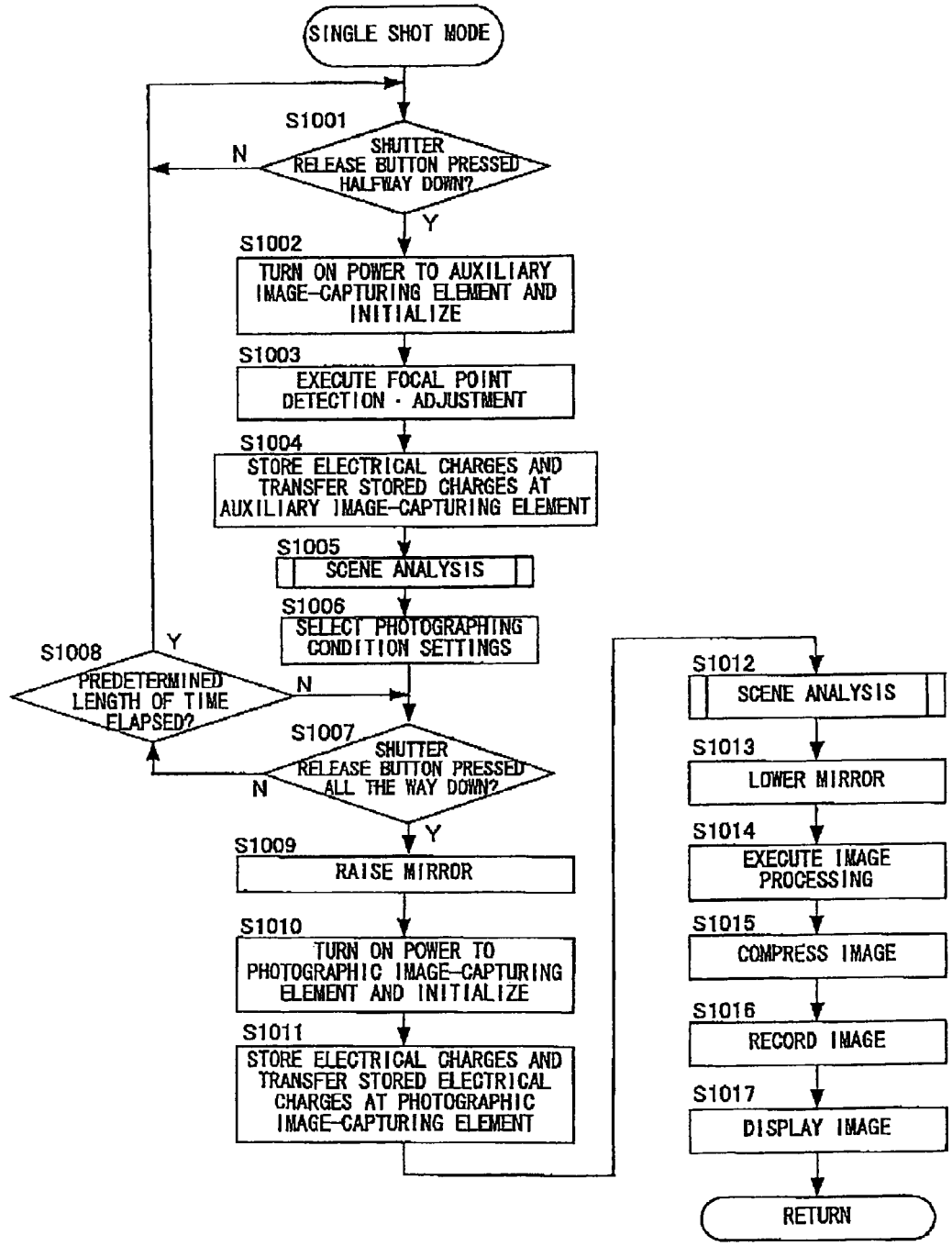
FIG. 19 presents a flowchart of the operation executed in the single shot mode in the third embodiment.
Figure 20:
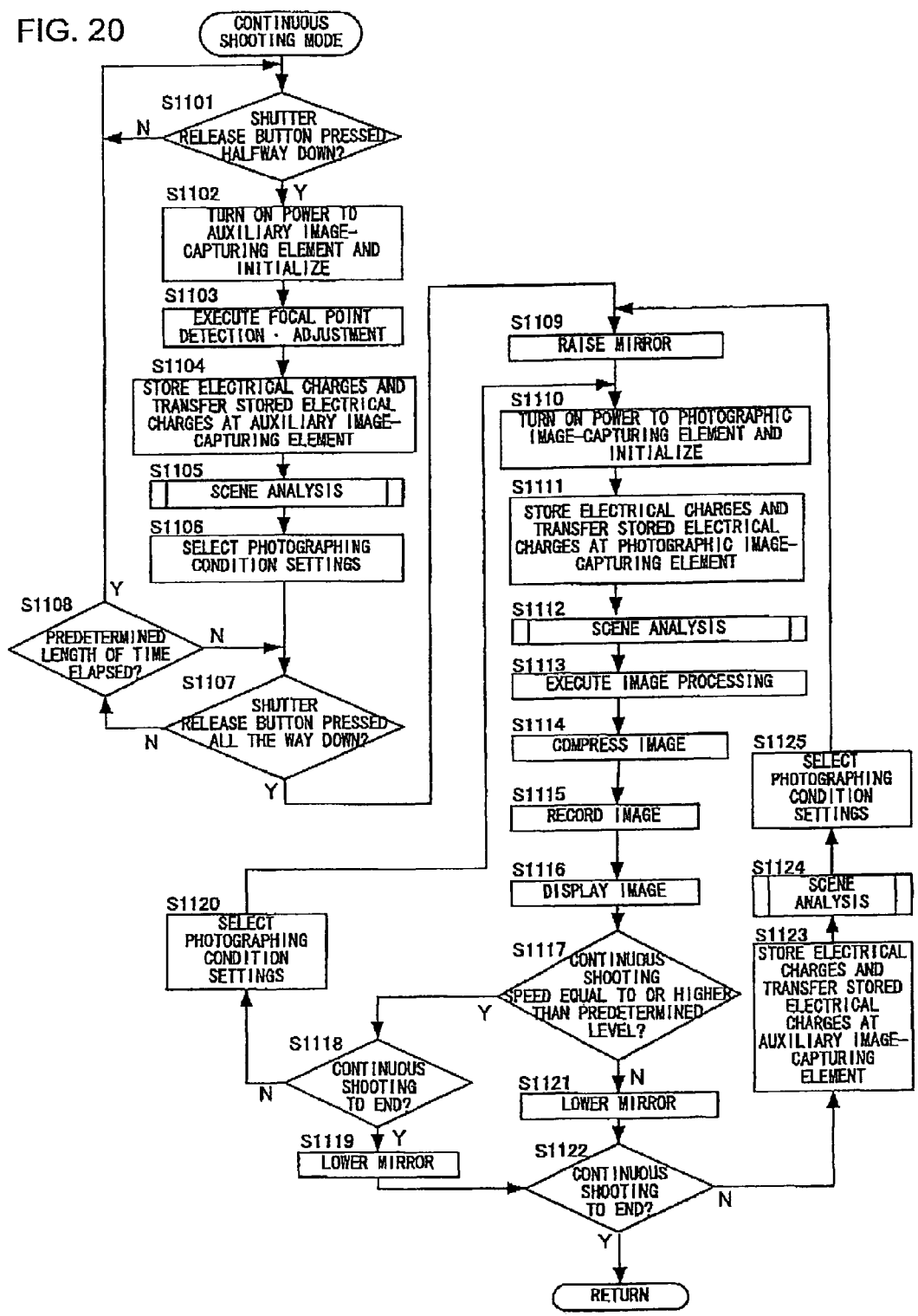
FIG. 20 presents a flowchart of the operation executed in the continuous shooting mode in the third embodiment.
Figure 21:
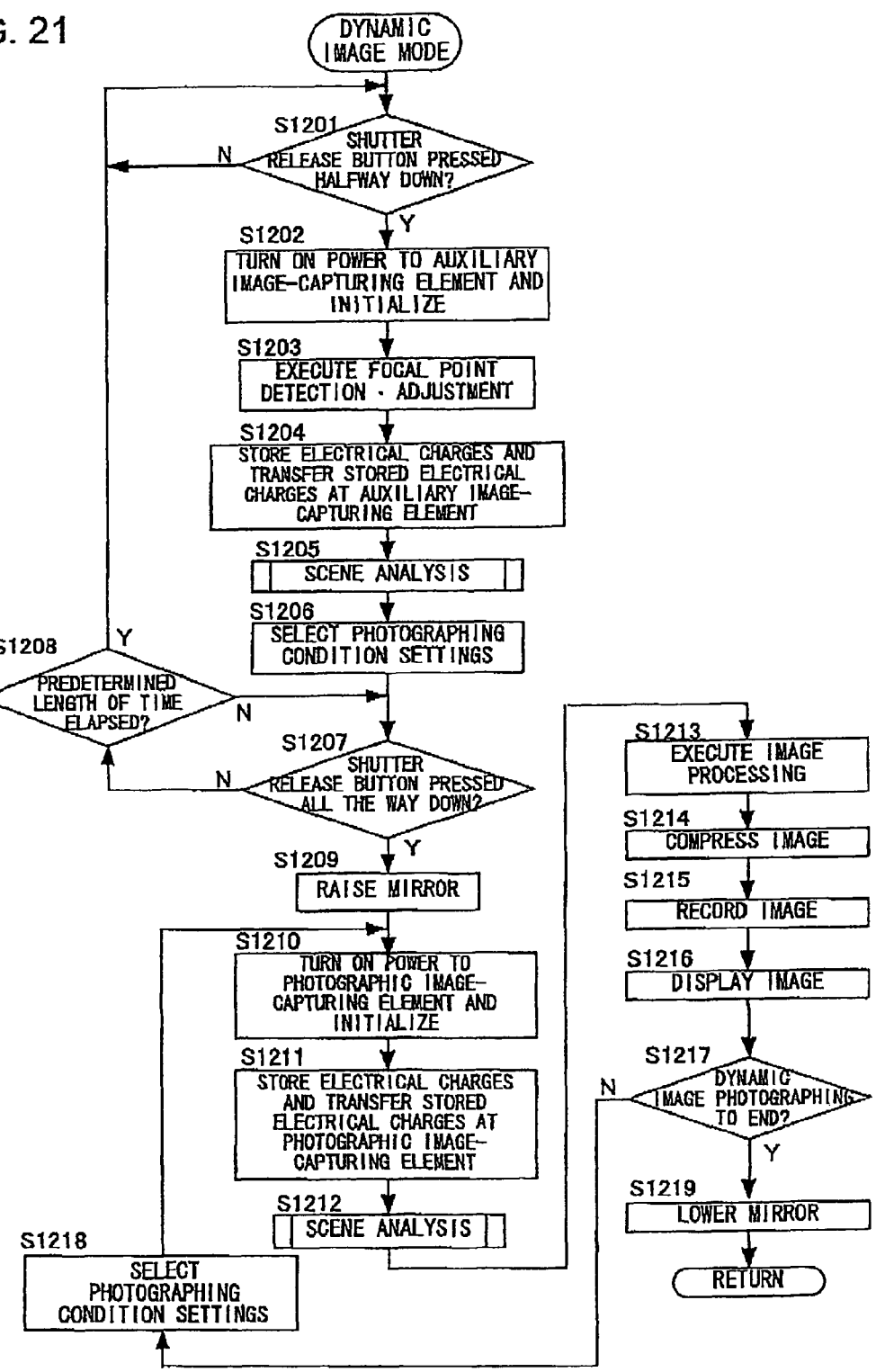
FIG. 21 presents a flowchart of the operation executed in the dynamic image mode in the third embodiment.
Figure 22:
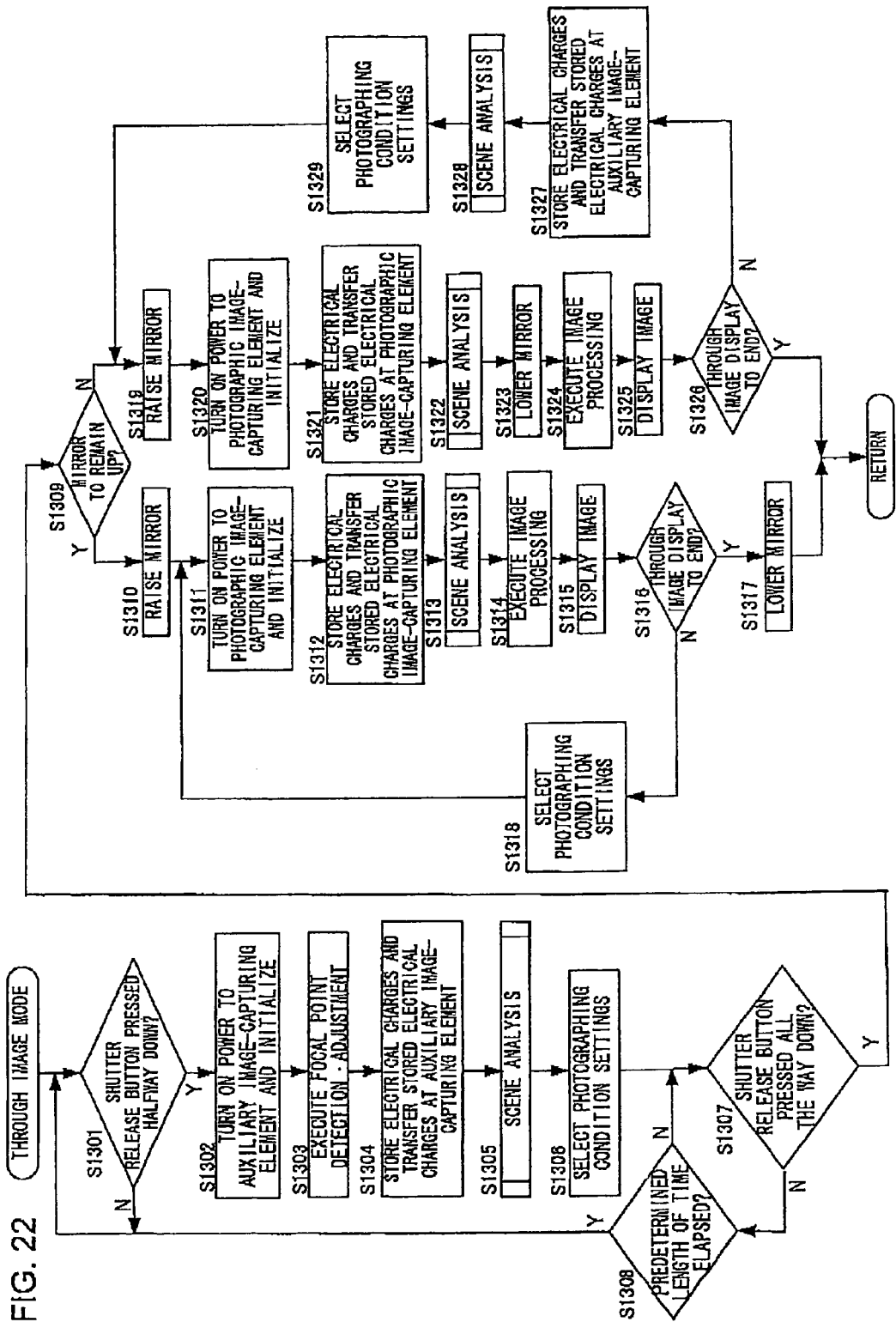
FIG. 22 presents a flowchart of the operation executed in the through image display mode in the third embodiment.

The operations executed in the electronic camera in the third embodiment structured as described above in the single shot mode, the continuous shooting mode, the dynamic image mode and the through image display mode are respectively shown in the flowchart presented in FIG. 19, the flowchart presented in FIG. 20, the flowchart presented in FIG. 21 and the flowchart presented in FIG. 22.

The operation executed in the single shot mode as shown in the flowchart presented in FIG. 19 is a combination of the operations executed in the single shot mode, as shown in the flowchart presented in FIGS. 8 and 14. Namely, in the third embodiment, the main CPU 31 executes scene analysis based upon image data provided from the auxiliary image-capturing element 19 in step S1005 and then selects the photographing condition settings based upon the scene analysis results in the single shot mode. In addition, the main CPU 31 engages the sub CPU 53 to execute scene analysis based upon image data provided from the photographic image-capturing element 13 in step S1012. Then, based upon the results of this scene analysis, the image processing circuit 30 executes image processing on the photographic image.

The operation executed in the continuous shooting mode as shown in the flowchart presented in FIG. 20 is a combination of the operations executed in the continuous shooting mode, as shown in the flowchart presented in FIGS. 9 and 15. Namely, in the third embodiment, the main CPU 31 executes scene analysis based upon image data provided from the auxiliary image-capturing element 19 in step S1105 and then selects the photographing condition settings based upon the scene analysis results in the continuous shooting mode. In addition, the main CPU 31 engages the sub CPU 53 to execute scene analysis based upon image data provided from the photographic image-capturing element 13 in step S1112. Then, based upon the results of this scene analysis, the image processing circuit 30 executes image processing on the photographic image. If the continuous shooting speed is set equal to or higher than a predetermined level, the main CPU 31 selects the photographing condition settings for a second or subsequent photographic image and the image processing circuit 30 executes the image processing for the second or subsequent image by using the results of the scene analysis having been executed in step S1112. If, on the other hand, the continuous shooting speed is set to a level lower than the predetermined level, the main CPU 31 selects the photographing condition settings for the second or subsequent photographic image by using the results of the scene analysis executed in step S1124 and the image processing circuit 30 executes the image processing for the second or subsequent photographic image by using the results of the scene analysis having been executed in step S1112.

The operation executed in the dynamic image mode as shown in the flowchart presented in FIG. 21 is a combination of the operations executed in the dynamic image mode, as shown in the flowcharts presented in FIGS. 10 and 16. Namely, in the third embodiment, the main CPU 31 executes scene analysis based upon image data provided from the auxiliary image-capturing element 19 in step S1205 and then selects the photographing condition settings for the first photographic image based upon the scene analysis results in the dynamic image mode. In addition, the main CPU 31 engages the sub CPU 53 to execute scene analysis based upon image data provided from the photographic image-capturing element 13 in step S1212. Then, based upon the results of this scene analysis, the image processing circuit 30 executes image processing on the photographic image and the main CPU 31 selects the photographic condition settings for the second or subsequent photographic image.

The operation executed in the through image display mode as shown in the flowchart presented in FIG. 22 is a combination of the operations executed in the through image display mode, as shown in a flowchart presented in FIGS. 11 and 17. Namely, in the through image display mode in the third embodiment, scene analysis is executed by the sub CPU 53 and the main CPU 31 respectively based upon image data provided from the photographic image-capturing element 13 and image data provided by the auxiliary image-capturing element 19. Then, the main CPU 31 selects the photographing condition settings and the image processing circuit 30 executes the image processing for the display image by using the scene analysis results. It is to be noted that the specific image data to be used for the scene analysis, i.e., either the image data output from the photographic image-capturing element 13 or the image data output from the auxiliary image-capturing element 19, are selected in accordance to whether the through image display is brought up by holding the quick-return mirror 11 at the UP position or by driving the quick-return mirror 11 up/down for each frame.

The advantages of the first and second embodiment are also achieved in the electronic camera in the third embodiment.

The embodiments described above allow for the following variations.

Figure 23A:
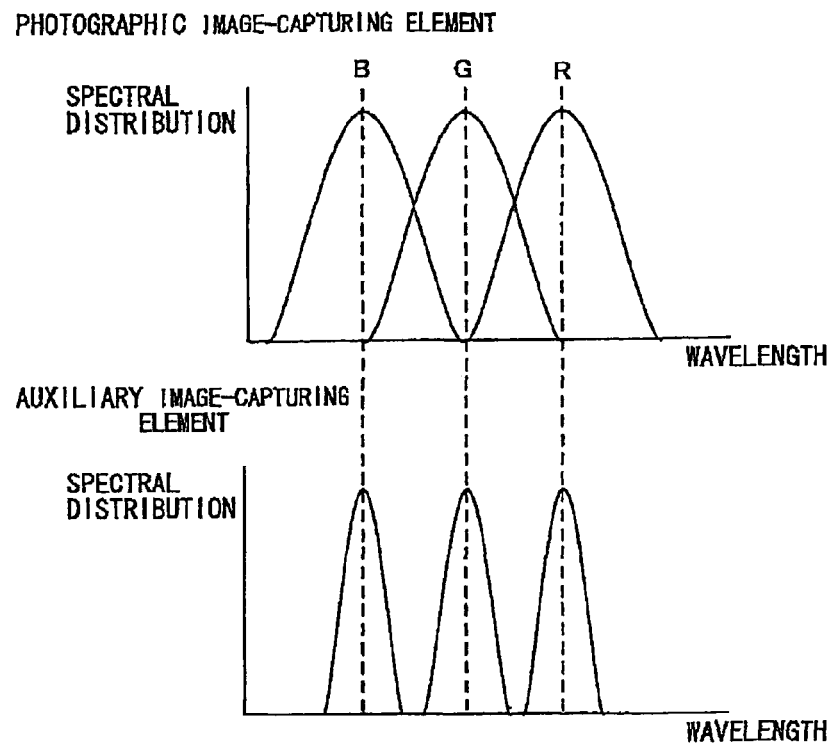
FIG. 23 illustrates spectral distributions that may be achieved by altering the spectral sensitivity characteristics of the photographic image-capturing element and the auxiliary image-capturing element, with FIG. 23A showing the case in which a spectral sensitivity width in correspondence to the R, G and B colors of the auxiliary image-capturing element 19 is different from that of the photographic image-capturing element 13 and FIG. 23B showing the case in which the spectral sensitivity peaks of the R, G and B colors of the auxiliary image-capturing element 19 is different from those of the photographic image-capturing element 13.
Figure 23B:
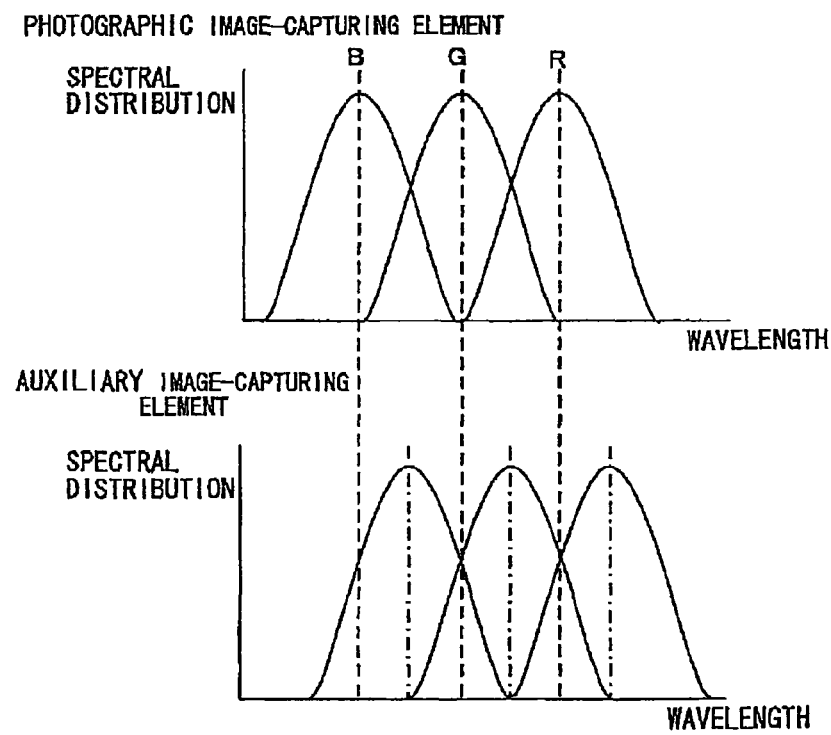

(1) The spectral sensitivity characteristics of the photographic image-capturing element 13 and the spectral sensitivity characteristics of the auxiliary image-capturing element 19 may be different from each other. In such a case, a smaller spectral sensitivity width may be set in correspondence to the R, G and B colors at the auxiliary image-capturing element 19 compared to the spectral sensitivity width of the R, G and B colors at the photographic image-capturing element 13, as shown in FIG. 23A. Alternatively, the spectral sensitivity peaks of the R, G and B colors at the auxiliary image-capturing element 19 may be offset relative to the spectral sensitivity peaks of the R, G and B colors at the photographic image-capturing element 13, as shown in FIG. 23B. By adjusting the spectral sensitivity characteristics as described above, it can be ensured that any color information that cannot be detected via the photographic image-capturing element 13 can be captured via the auxiliary image-capturing element 19, making it possible to judge the color with a high level of reliability.

(2) In the explanation given above in reference to the embodiments, the photographing operation in the continuous shooting mode is executed either by holding the quick-return mirror 11 at the UP position indicated by the solid line in FIG. 1 or by driving the quick-return mirror 11 up/down for each photographic frame in accordance with the continuous shooting speed setting having been selected. Alternatively, the quick-return mirror 11 is either held or driven in response to a setting operation performed by the photographer as in the through image display mode.

(3) In the through image display mode in the third embodiment, the specific image data to be used for the scene analysis, i.e., either the image data output from the photographic image-capturing element 13 or the image data output from the auxiliary image-capturing element 19, are determined in accordance to whether the through image photographing operation is executed by holding the quick-return mirror 11 at the UP position or by driving the quick-return mirror up/down for each photographic frame. Instead, either the image data provided by the photographic image-capturing element 13 or the image data provided by the auxiliary image-capturing element 19 may be selected to be used in the scene analysis in response to a setting operation performed by the photographer and the quick-return mirror 11 may be held or driven based upon the selection results.

The above described embodiments are examples, and various modifications can be made without departing from the spirit and scope of the invention.

What is claimed is:

1. An imaging apparatus, comprising:
   a photographic image-capturing element that outputs photographic image signals representing a plurality of color components by capturing a subject image passing through a photographic lens;
   an auxiliary image-capturing element that outputs auxiliary image signals representing a plurality of color components by capturing the subject image passing through the photographic lens; and
   an analyzing device that extracts an achromatic area of a photographic subject within an entire area of a photographic image by analyzing the color components of the auxiliary image signals with linearity.

2. An imaging apparatus, comprising:
   a photographic image-capturing element that outputs photographic image signals with linearity representing a plurality of color components by capturing a subject image passing through a photographic lens;
   an auxiliary image-capturing element that outputs auxiliary image signals representing a plurality of color components by capturing the subject image passing through the photographic lens;
   a first analyzing device that executes scene analysis of a photographic image by using the photographic image signals with linearity captured by the photographic image-capturing element; and a second analyzing device that (1) executes scene analysis of the photographic image and that (2) extracts an achromatic area of a photographic subject within an entire area of the photographic image by analyzing the color components of the auxiliary image signals with linearity captured by the auxiliary image-capturing element.

3. An imaging apparatus, comprising:

a photographic image-capturing element that outputs photographic image signals with linearity representing a plurality of color components by capturing a subject image passing through a photographic lens;

an auxiliary image-capturing element that outputs auxiliary image signals representing a plurality of color components by capturing the subject image passing through the photographic lens;

a first analyzing device that executes scene analysis of a photographic image by using the photographic image signals with linearity; and a second analyzing device that executes scene analysis of the photographic image by using the auxiliary image signals with linearity, wherein:

the first analyzing device extracts a feature of a photographic subject based upon continuity of first spectral characteristics and continuity of second spectral characteristics, the first spectral characteristics manifesting over the entire area and the second spectral characteristics manifesting in small areas defined by dividing the entire area; and the second analyzing device extracts the feature of the photographic subject based upon continuity of third spectral characteristics and fourth spectral characteristics, the third spectral characteristics manifesting over the entire area and the fourth spectral characteristics manifesting in the small areas.

4. An imaging apparatus according to claim 3, wherein:

the photographic image-capturing element outputs the photographic image signals that include fifth spectral characteristics with regard to the plurality of color components;

the auxiliary photographic image-capturing element outputs the auxiliary image signals that include sixth spectral characteristics different from the fifth spectral characteristics with regard to the plurality of color components.

5. An imaging apparatus according to claim 2, wherein:

the auxiliary image-capturing element is disposed at a position equivalent to a position of the photographic image-capturing element relative to the photographic lens.

6. An imaging apparatus according to claim 2, wherein:

the auxiliary image-capturing element has fewer pixels than the photographic image-capturing element.

7. An imaging apparatus, comprising:

a photographic image-capturing element that outputs photographic image signals with linearity representing a plurality of color components by capturing a subject image passing through a photographic lens;

an auxiliary image-capturing element that outputs auxiliary image signals representing a plurality of color components by capturing the subject image passing through the photographic lens;

a first analyzing device that executes scene analysis of a photographic image by using the photographic image signals with linearity;

a second analyzing device that executes scene analysis of the photographic image by using the auxiliary image signals with linearity;

a selection unit that selects a specific mode among photographing modes including a single shot mode, a continuous shooting mode, a dynamic image mode and a through image mode;

an arithmetic operation circuit that determines photographing condition settings through arithmetic operation based upon first results of the scene analysis executed by the first analyzing device or second results of the scene analysis executed by the second analyzing device; and an image processing circuit that executes image processing on the image signals based upon the first results of the scene analysis or the second results, wherein:

if the selection unit selects the single shot mode, the arithmetic operation circuit determines the photographing condition setting based upon the second results of the scene analysis and the image processing circuit executes image processing based upon the first results of the scene analysis, if the selection unit selects one of the continuous shooting mode and the dynamic image mode, the image processing circuit executes image processing on the image signals based upon the first results of the scene analysis.

8. An imaging apparatus according to claim 7, further comprising:

a mirror that drives between a first position and a second position and that reflects light toward the auxiliary image-capturing element when the mirror is at the first position;

a mirror drive setting unit that sets one of a first drive mode and a second drive mode when the selection unit selects the through image mode, in the first drive mode the mirror driving between the first position and the second position in correspondence to each of the photographic image signals output by the photographic image-capturing element and in the second drive mode the mirror being held at the second position as the photographic image-capturing element outputs the photographic image signals, wherein:

if the mirror drive setting unit sets the first drive mode, the arithmetic operation circuit determines the photographing condition setting based upon the first results of the scene analysis and the image processing circuit executes image processing based upon the first results of the scene analysis, and if the mirror drive setting unit sets the second drive mode, the arithmetic operation circuit determines the photographing condition setting based upon the second results of the scene analysis and the image processing circuit executes image processing based upon the first results of the scene analysis.

9. An imaging apparatus according to claim 8, wherein:

before the image-capturing element outputs the photographic image signals corresponding to a first frame of the photographic image in the through image mode, the arithmetic operation circuit determines the photographing condition setting based upon the second results of the scene analysis regardless of the first drive mode and the second drive mode.

10. An imaging apparatus according to claim 1, wherein:

the analyzing device extracts the achromatic area within an entire area of the photographic image based upon a comparison of continuity of first spectral characteristics with continuity of second spectral characteristics, the first spectral characteristics manifesting over an entire area and the second spectral characteristics manifesting in small areas defined by dividing the entire area.

11. An imaging apparatus according to claim 3, wherein: the feature of a photographic subject is an achromatic area within an entire area.

12. An imaging apparatus, comprising:
a photographic image-capturing element that outputs photographic image signals with linearity representing a plurality of color components by capturing a subject image passing through a photographic lens;
an analyzing device that executes scene analysis of a photographic image by using the photographic image signals with linearity, wherein:
the analyzing device extracts a feature of a photographic subject in the photographic image based upon continuity of first spectral characteristics and continuity of second spectral characteristics, the first spectral characteristics manifesting over the entire area of the photographic image and the second spectral characteristics manifesting in small areas defined by dividing the entire area of the photographic image.

13. An imaging apparatus according to claim 12, wherein: the analyzing device extracts a specific area of the photographic image based upon comparison of continuity of the first spectral characteristics with continuity of the second spectral characteristics.

* * * * *